US008326755B2

(12) United States Patent
Petersen et al.

(10) Patent No.: US 8,326,755 B2
(45) Date of Patent: Dec. 4, 2012

(54) ADMINISTERING CONTRACTS OVER DATA NETWORK

(75) Inventors: James C. Petersen, Richmond, VA (US); Stephen Cole, Durham, NC (US); Todd Barbour, Chapel Hill, NC (US); Sherwood Creedle, South Hill, VA (US)

(73) Assignee: Hart Business Solutions, LLC, South Hill, VA (US)

( * ) Notice: Subject to any disclaimer, the term of this patent is extended or adjusted under 35 U.S.C. 154(b) by 0 days.

(21) Appl. No.: 13/194,516

(22) Filed: Jul. 29, 2011

(65) Prior Publication Data
US 2012/0022982 A1 Jan. 26, 2012

Related U.S. Application Data

(62) Division of application No. 12/137,680, filed on Jun. 12, 2008, now Pat. No. 8,015,113.

(60) Provisional application No. 60/943,746, filed on Jun. 13, 2007, provisional application No. 61/060,530, filed on Jun. 11, 2008.

(51) Int. Cl.
*G06Q 40/00* (2012.01)
(52) U.S. Cl. ........................................................ 705/40
(58) Field of Classification Search .................. None
See application file for complete search history.

(56) References Cited

U.S. PATENT DOCUMENTS

| 5,189,606 A | 2/1993 | Burns et al. |
| 5,689,705 A | 11/1997 | Fino et al. |
| 5,761,674 A | 6/1998 | Ito |
| 5,799,286 A | 8/1998 | Morgan et al. |
| 5,893,082 A | 4/1999 | McCormick |
| 5,926,816 A | 7/1999 | Bauer et al. |
| 5,950,206 A | 9/1999 | Krause |
| 5,991,769 A | 11/1999 | Fino et al. |
| 6,038,547 A | 3/2000 | Casto |
| 6,078,907 A | 6/2000 | Lamm |
| 6,393,410 B1 | 5/2002 | Thompson |
| 6,446,053 B1 | 9/2002 | Elliott |
| 7,330,822 B1 | 2/2008 | Robson et al. |
| 2002/0016725 A1 | 2/2002 | Eichstaedt et al. |
| 2002/0073114 A1 | 6/2002 | Nicastro et al. |
| 2005/0289051 A1 | 12/2005 | Allin et al. |
| 2007/0061774 A1* | 3/2007 | Chan et al. ................ 717/101 |
| 2007/0078771 A1 | 4/2007 | Allin et al. |
| 2007/0265962 A1* | 11/2007 | Bowe et al. ................. 705/40 |
| 2007/0288334 A1 | 12/2007 | Creedle et al. |
| 2008/0133307 A1 | 6/2008 | Creedle et al. |

OTHER PUBLICATIONS

Power Point presentation of Hart Business Solutions, presents GCPAY.
"e-Builder Enterprise tm," www.e-builder.net.
"Meridian Systems—Products," www.mps.com.
"PrimeContract: The Future Construction," www.primavera.com (2001).

(Continued)

*Primary Examiner* — Olabode Akintola
(74) *Attorney, Agent, or Firm* — Volentine & Whitt, PLLC

(57) ABSTRACT

A method for administering performance of a contract over a data network includes storing a lien waiver and receiving an application for payment over the data network from a contract participant based on performance under the contract. The stored lien waiver is retrieved and sent to the participant via the data network upon approval of the application for payment. The at least one data tag may be included in the lien waiver prior to storing the lien waiver.

8 Claims, 30 Drawing Sheets

OTHER PUBLICATIONS

"Primavera and PurchasePro.com Create E-Commerce Marketplace: PrimeContract.com link contractors, owners and suppliers for trading supplies and services," Dialog NewsRoom, Dialog File No. 995 Accession No. 1044114 (Jan. 1, 2000).

"Primavera PrimeContract Provides Construction Industry with Revolutionary Progress Payment and Negotiation Capabilities—Upgraded Version of Progress Payments Speeds Payment Requisition Consolidation," Dialog NewsRoom, Dialog File No. 994 Accession No. 353515951 (Nov. 13, 2001).

"Primavera Launches Prime Contract for the Construction Industry; PrimeContract Streamlines E-Commerce, Collaboration and Project Control via the Internet", Nov. 29, 2001, Business wire, pp. 1-3.

Primavera PrimeContract Brochure, Sep. 25, 2001, Primavera, pp. 1-3.

New York State Office of the State Comptroller, Bulletin No. A-191 R1, Oct. 18, 1999, pp. 1-2.

*SK Drywall v. Developers Financial*, Nov. 8, 1991, Arizona Business Gazette, p. 52.

CREDO Reference, Definition of Proxy, Oct. 1, 2007.

"PrimeContract Goes Live and the World According to Joel Koppelman", Nov. 30, 2000, Construction.com, pp. 1-3.

Office Action (3 months) dated Oct. 15, 2007; U.S. Appl. No. 10/673,142, filed Sep. 30, 2003; Inventor—Sherwood Creedle et al.

Final Office Action (3 months) dated Apr. 16, 2008; U.S. Appl. No. 10/673,142, filed Sep. 30, 2003; Inventor—Sherwood Creedle et al.

Examiners Answer to the Appeal Brief filed Jul. 21, 2008; U.S. Appl. No. 10/673,142, filed Sep. 30, 2003; Inventor—Sherwood Creedle et al.

Office Action (3 months) dated Jun. 5, 2009; U.S. Appl. No. 11/927,961, filed Oct. 30, 2007; Inventor—Sherwood Creedle et al.

Final Office Action (3 months) dated Dec. 24, 2009; U.S. Appl. No. 11/927,961, filed Oct. 30, 2007; Inventor—Sherwood Creedle et al.

Non-Office Action mailed Jul. 25, 2011 for U.S. Appl. No. 11/927,961.

"GCPay Timberline Integrator: User Guide", Hart Business Solutions, LLC, Jul. 2007, pp. 1-28.

\* cited by examiner

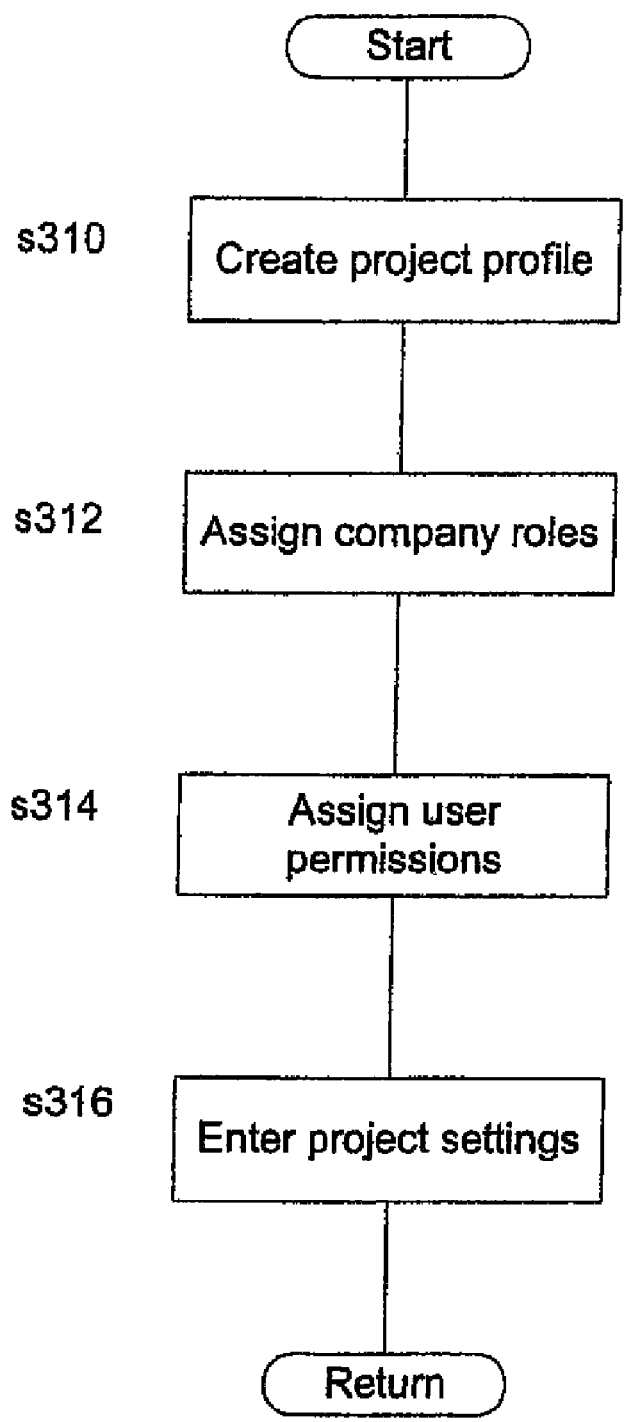
Fig. 3 - Create Project

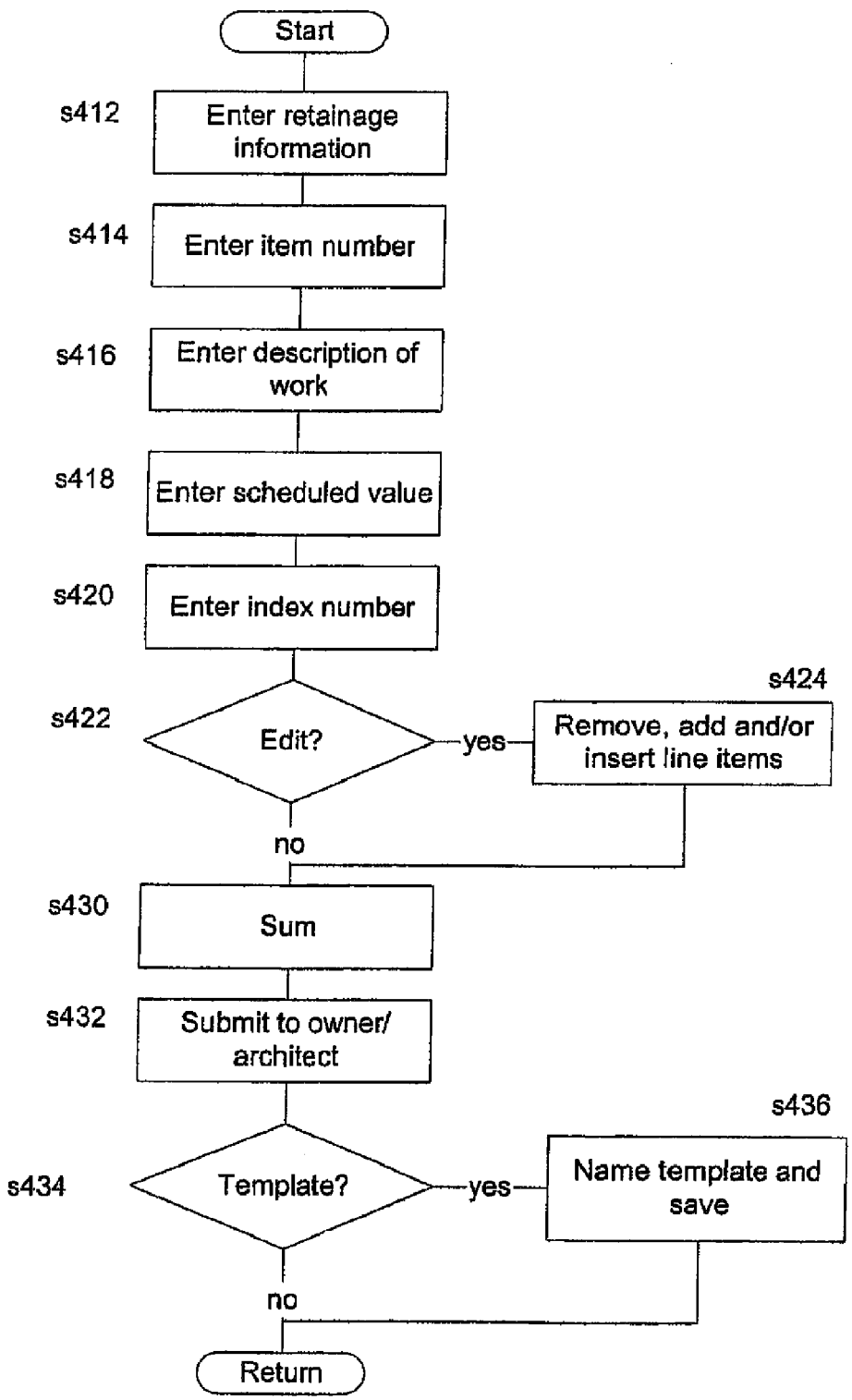
Fig. 4 - SOV

FIG. 5

| GCPay | | Project Center | Project Detail | Main | Layout |

Create General Contractor Schedule of Values

Company: Example Construction      Project: Example Project 1(1) — 501

502 — Contract Start Date: 01/01/2001      Contract for: [Example Project] — 500

504 — To Owner:
Example Owner One
123 Main Street
Anytown, VA 23233

503 — From:
Example Construction
123 Main Street
Anytown, VA 23233

505 — Retainage:

% of Stored Material:    [.05]
Format: .99

% of Completed Work:    [.05]
Format: .99

Maximum Retainage Unit:    [20000.00]
Format: 9999999999.99

| 508 Item No. | 509 Description of Work | 510 Scheduled Value | 512 Remove | 511 Index |
|---|---|---|---|---|
| | | | ☐ | 1 |
| | | | ☐ | 2 |
| | | | ☐ | 3 |
| | | | ☐ | 4 |
| | | | ☐ | 5 |
| | | | ☐ | 6 |
| | | | ☐ | 7 |
| | | | ☐ | 8 |
| | | | ☐ | 9 |
| | | | ☐ | 10 |
| | | | ☐ | 11 |

Contract Sum:    N/A

521 — Add [1] more lines   [Add GC Item(s)] — 522

[Remove GC Item(s)] — 520

523 — Insert [1] lines(s) after index   524 — [1]   [Insert Item(s)] — 525

530 — [Create]   [Cancel] — 531

*FIG. 6*

| GCPay | Project Center | Project Detail | Main | Layout |
|---|---|---|---|---|

General Contractor Schedule of Values

Company: Example Owner One          Project: Example Project 1(1)

Printer-Friendly / Audit Trail

Contract Start Date: 01/01/2001          Contract for: Example Project

To Owner:
Example Owner One
123 Main Street
Anytown, VA 23233

From:
Example Construction
123 Main Street
Anytown, VA 23233

~600

Retainage:
% of Stored Material: 5.00%
% of Completed Work: 5.00%
Maximum Retainage Unit: $20,000.00

| Item No. | Description of Work | Scheduled Value |
|---|---|---|
| 101 | Mobilization | 22,000.00 |
| 102 | General Conditions | 10,000.00 |
| 103a | Clear Building Pad | 11,000.00 |
| 103b | Clear Remaining Site | 6,000.00 |
| 104 | Earthwork | 33,000.00 |
| 105 | Well and Waterline | 10,000.00 |
| 106 | CMU Foundations – Material | 8,800.00 |
| 107 | CMU Foundations – Labor | 12,000.00 |
| 108 | CMU Bearing Walls – Material | 17,600.00 |
| 109 | CMU Bearing Walls – Labor | 17,600.00 |
| 110 | CMU Non-Bearing Walls – Material | 8,800.00 |
| 111 | CMU Non-Bearing Walls – Labor | 8,800.00 |
| 112 | Brick – Material | 10,000.00 |
| 113 | Brick – Labor | 18,000.00 |
| 201 | Structural Steel – Material | 44,000.00 |
| 202 | Structural Steel – Labor | 22,000.00 |
| 203 | Joist Steel – Material | 500.00 |
| 204 | Joist Steel – Labor | 500.00 |
| 301 | Rough Carpentry – Material | 22,000.00 |
| 302 | Rough Carpentry – Labor | 18,000.00 |
| 304 | Casework – Material | 18,000.00 |
| 305 | Casework – Labor | 3,000.00 |

FIG. 6 cont.

| | | |
|---|---|---:|
| 306 | Windows and Doors – Materials | 8,000.00 |
| 307 | Windows and Doors – Labor | 4,000.00 |
| 308 | Ceramic Tile – Materials | 6,500.00 |
| 309 | Ceramic Tile – Labor | 6,500.00 |
| 310 | Carpeting – Materials | 16,000.00 |
| 311 | Carpeting – Labor | 16,000.00 |
| 312 | Drywall – Material | 11,000.00 |
| 313 | Drywall – Labor | 5,500.00 |
| 401 | HVAC – Material | 44,000.00 |
| 402 | HVAC – Labor | 12,000.00 |
| 403 | Ductwork – Material | 3,300.00 |
| 404 | Ductwork – Labor | 3,300.00 |
| 501 | Fixtures and Lamps – Material | 6,600.00 |
| 502 | Fixtures and Lamps | 4,400.00 |
| 601 | Branch and Feeder Conduit – Material | 4,400.00 |
| 602 | Branch and Feeder Conduit – Labor | 2,200.00 |
| 603 | Electric Devices – Material | 1,000.00 |
| 604 | Electric Devices – Labor | 900.00 |
| 701 | Plumbing – Material | 12,000.00 |
| 702 | Plumbing – Labor | 9,000.00 |
| 703 | Plumbing Fixtures – Materials | 6,000.00 |
| 704 | Plumbing Fixtures – Labor | 4,000.00 |

Contract Sum: $507,300.00
610

Review General Contractor Schedule of Values

Once the General Contractor Schedule of Values has been APPROVED, its state cannot change. Therefore, be absolutely sure that the Schedule of Values is ready to be approved before approving it in GCPay.

Choose to either APPROVE or REJECT the Schedule of Values:

○ Approve   ○ Reject

614 — Comments:

[            ]

612 — [ Submit ]

FIG. 7

| Item No. | Description of Work | Scheduled Value |
|---|---|---|
| ☐ 101 | Mobilization | $22,000.00 |

SAVE — 730

| | Subcontractor | Item No. | Description of Work | Scheduled Value | Index |
|---|---|---|---|---|---|
| ☐ | Example Subcontractor One | 1 | Engineering Layout | $20,000.00 | 1 |
| | | | Total: | $20,000 | |
| ☐ 102 | | | General Conditions | $10,000.00 | 2 |
| ☐ 103a | | | Clear Building Pad | $11,000.00 | 3 |
| ☐ 103b | | | Clear Remaining Site | $6,000.00 | 4 |

| | Subcontractor | Item No. | Description of Work | Scheduled Value |
|---|---|---|---|---|
| ☐ | Example Subcontractor One | 3 | Clear Remaining | $5,000.00 |
| | | | Total: | $5,000 |

| | | | |
|---|---|---|---|
| ☒ 104 | Earthwork | $33,000.00 | |
| ☐ 105 | Well and Waterline | $10,000.00 | |
| ☐ 106 | CMU Foundations Material | | |
| ☐ 107 | CMU Foundations | | |
| ☐ 108 | CMU Bearing Walls Material | | |
| ☐ 109 | CMU Bearing Walls | | |
| ☐ 110 | CMU Non-Bearing Material | | |
| ☐ 111 | CMU Non-Bearing Labor | | |
| ☐ 112 | Brick – Material | $18,000.00 | |
| ☐ 113 | Brick – Labor | $44,000.00 | |
| ☐ 201 | Structural Steel – Material | $22,000.00 | |
| ☐ 202 | Structural Steel – Labor | | |

Items – Web Page Dialog ☒

710

| | | | |
|---|---|---|---|
| ☐ Current Unassociated | | | |
| ☐ Example Subcontractor Four | 1a | Structural Steel – Material | $40,000.00 |
| ☐ Example Subcontractor Four | 1b | Structural Steel – Labor | $20,000.00 |
| ☐ Example Subcontractor Four | 2a | Joint Steel – Material | $800.00 |
| ☐ Example Subcontractor Four | 2b | Joint Steel – Labor | $800.00 |
| ☐ Example Subcontractor Six | 1 | HVAC Controls – Material | $10,000.00 |
| ☐ Example Subcontractor Six | 2 | HVAC Controls – Labor | $2,000.00 |
| ☐ Example Subcontractor Three | 1001 | CMU Foundations – Materials | $8,000.00 |
| ☐ Example Subcontractor Three | 1002 | CMU Foundations – Labor | $10,000.00 |
| ☐ Example Subcontractor Three | 2001 | CMU Wall – Materials | $24,000.00 |
| ☐ Example Subcontractor Three | 2001 | CMU Wall – Labor | $24,000.00 |
| ☐ Example Subcontractor Two | 1 | Drywall – Material | $1,000.00 |
| ☐ Example Subcontractor Two | 2 | Drywall – Labor | $1,000.00 |

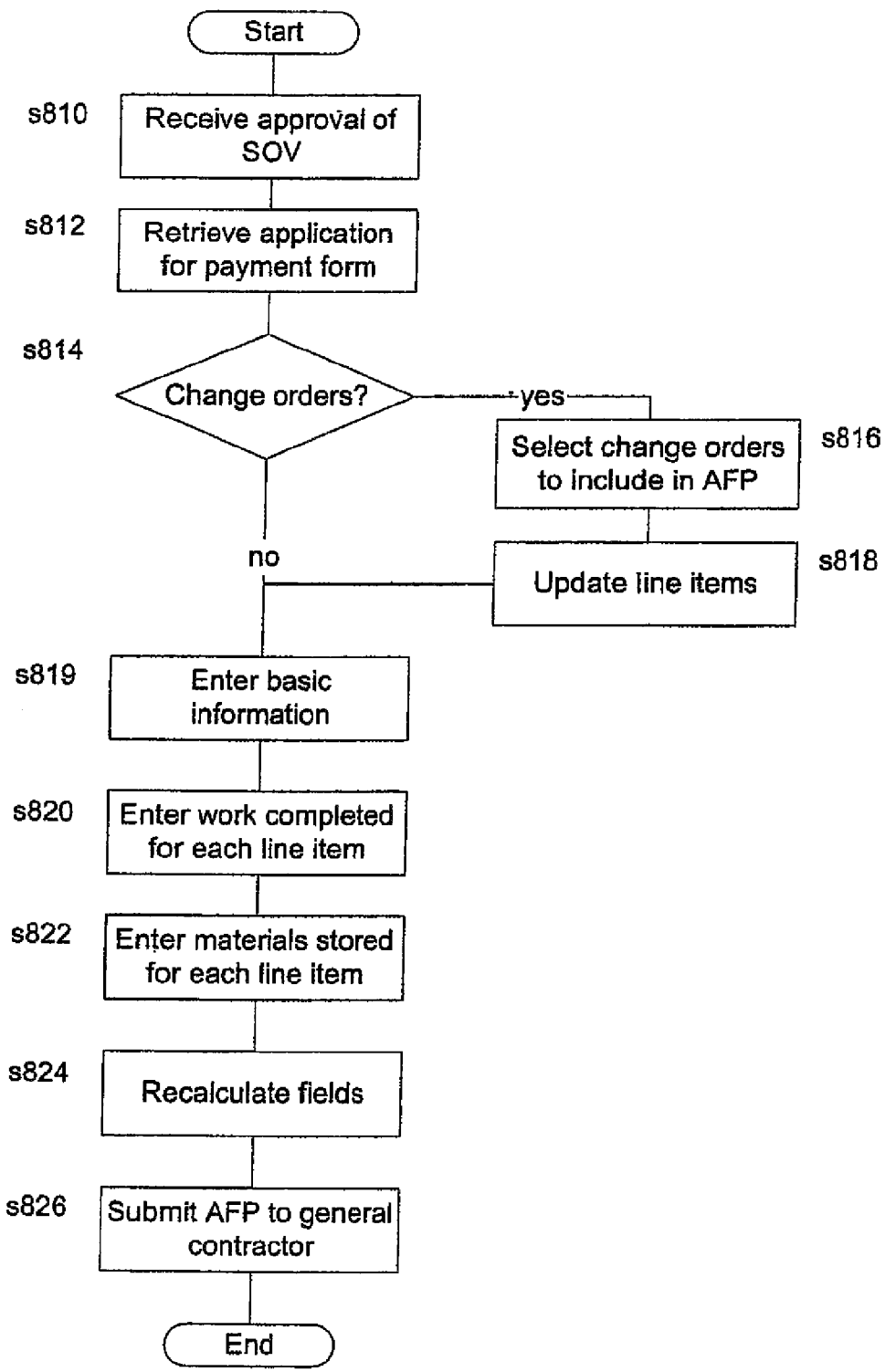
Fig. 8 - Subcontractor AFP

FIG. 9 cont.

Submit Subcontractor Application For Payment

Note that once the Application for Payment is SUBMITTED, all included Change Orders cannot be excluded. Therefore, be absolutely sure the Application For Payment is ready to be submitted before submitting it.

Please Choose whether or not you would like the owner to make modifications to your AFP.

○ Yes   ○ No ———— 931

Comments: ———— 932

[ Submit to Owner ] ———— 933

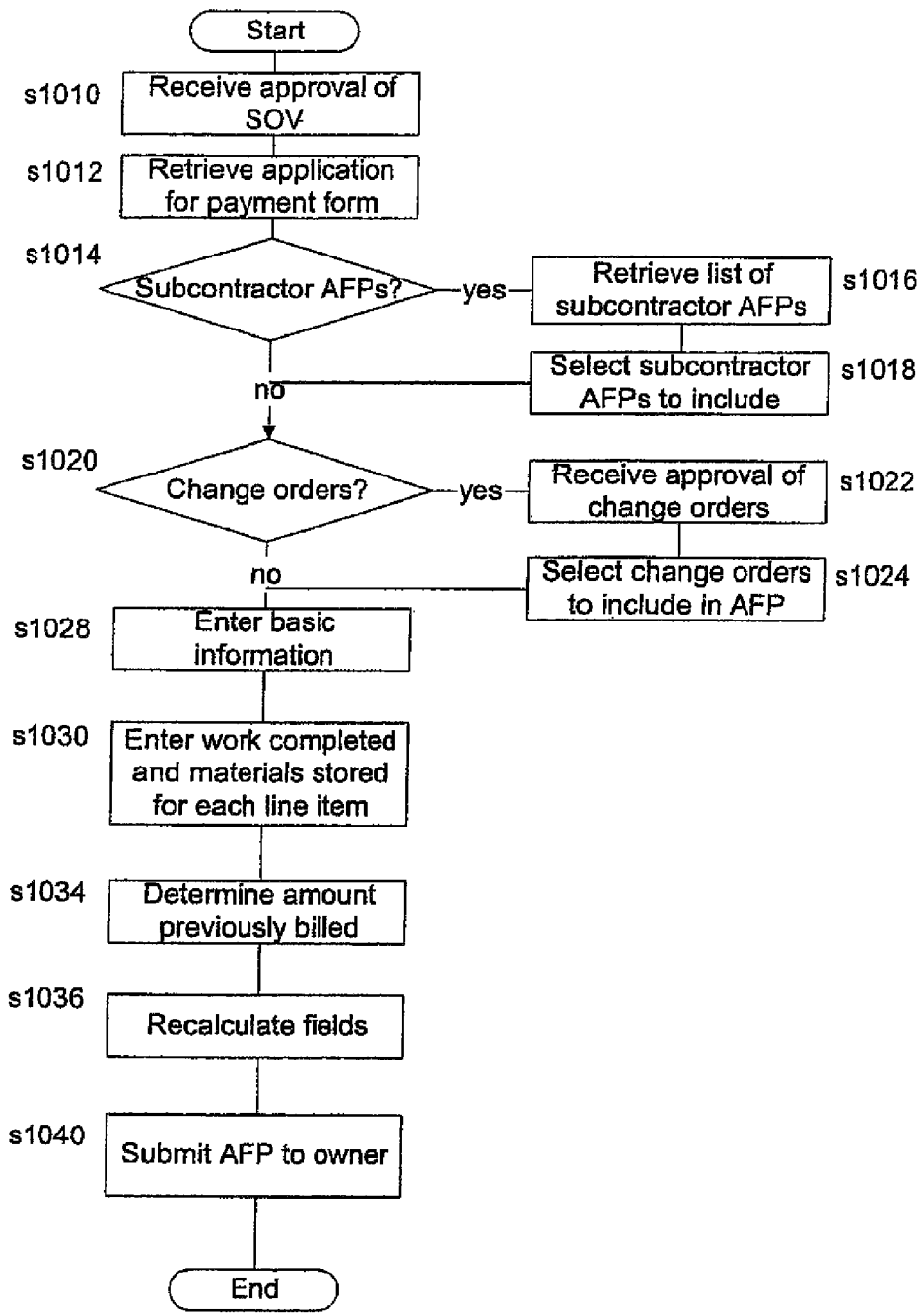
Fig. 10 - General Contractor AFP

FIG. 11

General Contractor Application for Payment

| | Project Center | Project Detail | Main | Layout |

Company: Example Construction      Project: Example Project 1(1)

*Edit / Summary / Printer-Friendly / Audit Trail*

Contract For: Example Project      1101 — Application No: 1
To Owner: Example Owner One      1102 — Application Date: 01/02/2001
123 Main Street
Anytown, VA 23233

From: Example Construction      1103 — Period To: 02/01/2001
123 Main Street
Anytown, VA 23233

Via Architect: Example Architect One      Contract Date: 01/01/2001
123 Main Street
Anytown, VA 23233

1110   1111   1112   1115   1113   1116   1117   1118   11111   1120

| A | B | C | D | E | F | G | | H |
|---|---|---|---|---|---|---|---|---|
| | | | \multicolumn{2}{Work Completed} | | | | |
| Item No. | Description of Work | Scheduled Value | From Previous Application (D+E) | This Period | Materials Presently Stored (Not in D or E) | Total Completed and Stored to Date (D+E+F) | % | Balance to Finish (C-G) |
| 101 | Mobilization | 22,000.00 | 0.00 | 11,000.00 | 0.00 | 11,000.00 | 50.00% | 11,000.00 |
| 102 | General Conditions | 10,000.00 | 0.00 | 0.00 | 0.00 | 0.00 | 0.00% | 10,000.00 |
| 103a | Clear Building Pad | 11,000.00 | 0.00 | 5,500.00 | 0.00 | 5,500.00 | 50.00% | 5,500.00 |
| 103b | Clear Remaining Site | 6,000.00 | 0.00 | 6,000.00 | 0.00 | 6,000.00 | 100.00% | 0.00 |
| 104 | Earthwork | 33,000.00 | 0.00 | 16,500.00 | 0.00 | 16,500.00 | 50.00% | 16,500.00 |
| 105 | Well and Waterline | 10,000.00 | 0.00 | 3,773.58 | 0.00 | 3,773.58 | 37.74% | 6,226.42 |

(MIDDLE LINES NOT SHOWN)

FIG. 11 cont.

(MIDDLE LINES NOT SHOWN)

| | | | | | | | | |
|---|---|---|---|---|---|---|---|---|
| 702 | Plumbing – Labor | 8,000.00 | 0.00 | 0.00 | 0.00 | 0.00 | 0.00% | 8,000.00 |
| 703 | Plumbing Fixtures – Materials | 6,000.00 | 0.00 | 0.00 | 0.00 | 0.00 | 0.00% | 6,000.00 |
| 704 | Plumbing Fixtures – Labor | 4,000.00 | 0.00 | 0.00 | 0.00 | 0.00 | 0.00 | 4,000.00 |
| Grand Totals: | | $507,300.00 | $0.00 | $50,133.58 | $0.00 | $50,133.58 | 9.88% | $457,166.42 |

1130

Submit General Contractor Application For Payment

Note that once the Application for Payment is SUBMITTED, all included Subcontractor Applications for Payment and all included Change Orders cannot be excluded. Therefore, be absolutely sure the Application for Payment is ready to be submitted before submitting it.

Comments: — 1132

Submit to Owner — 1133

SC – First Application for Payment

| A | B | C | D | E | F | G | H | I |
|---|---|---|---|---|---|---|---|---|
| | | | WORK COMPLETED | | | | | |
| ITEM | DESCRIPTION | SCHEDULED VALUE | FROM PREVIOUS APPLICATION (D + E) | THIS PERIOD | MATERIALS PRESENTLY STORED (NOT IN D OR E) | TOTAL COMPLETED AND STORED TO DATE (D+E+F) | % (G/C) | BALANCE TO FINISH (C - G) | RETAINAGE (IF VARIABLE RATE) |
| 1 | Copper Pipe | 10,000.00 | 0.00 | 3,000.00 | 2,000.00 | 5,000.00 | 50.00% | 5,000.00 | |
| 2 | PVC Pipe | 8,000.00 | 0.00 | 500.00 | 500.00 | 1,000.00 | 12.50% | 7,000.00 | |
| 3 | Labor | 12,000.00 | 0.00 | 4,000.00 | 0.00 | 4,000.00 | 33.33% | 8,000.00 | |
| | | 30,000.00 | 0.00 | 7,500.00 | 2,500.00 | 10,000.00 | 33.33% | 20,000.00 | |

1210

GC – First Application for Payment

| A | B | C | D | E | F | G | H | I |
|---|---|---|---|---|---|---|---|---|
| | | | WORK COMPLETED | | | | | |
| ITEM | DESCRIPTION | SCHEDULED VALUE | FROM PREVIOUS APPLICATION (D + E) | THIS PERIOD | MATERIALS PRESENTLY STORED (NOT IN D OR E) | TOTAL COMPLETED AND STORED TO DATE (D+E+F) | % (G/C) | BALANCE TO FINISH (C - G) | RETAINAGE (IF VARIABLE RATE) |
| 100 | Plumbing | 33,000.00 | 0.00 | 8,250.00 | 2,750.00 | 11,000.00 | 33.33% | 22,000.00 | |

SC - Second Application for Payment

1240

| | A | B | C | D | E | F | G | | H | I |
|---|---|---|---|---|---|---|---|---|---|---|
| | | | | WORK COMPLETED | | MATERIALS PRESENTLY STORED (NOT IN D OR E) | TOTAL COMPLETED AND STORED TO DATE (D + E + F) | % (G/C) | BALANCE TO FINISH (C - G) | RETAINAGE (IF VARIABLE RATE) |
| ITEM | | DESCRIPTION | SCHEDULED VALUE | FROM PREVIOUS APPLICATION (D + E) | THIS PERIOD | | | | | |
| 1 | | Copper Pipe | 10,000.00 | 3,000.00 | 3,000.00 | 2,000.00 | 8,000.00 | 80.00% | 2,000.00 | |
| 2 | | PVC Pipe | 8,000.00 | 500.00 | 4,000.00 | 500.00 | 5,000.00 | 62.50% | 3,000.00 | |
| 3 | | Labor | 12,000.00 | 4,000.00 | 4,000.00 | 0.00 | 8,000.00 | 66.67% | 4,000.00 | |
| | | | 30,000.00 | 7,500.00 | 11,000.00 | 2,500.00 | 21,000.00 | 70.00% | 9,000.00 | |

GC - Second Application for Payment

1260

| | A | B | C | D | E | F | G | | H | I |
|---|---|---|---|---|---|---|---|---|---|---|
| | | | | WORK COMPLETED | | MATERIALS PRESENTLY STORED (NOT IN D OR E) | TOTAL COMPLETED AND STORED TO DATE (D + E + F) | % (G/C) | BALANCE TO FINISH (C - G) | RETAINAGE (IF VARIABLE RATE) |
| ITEM | | DESCRIPTION | SCHEDULED VALUE | FROM PREVIOUS APPLICATION (D + E) | THIS PERIOD | | | | | |
| 100 | | Plumbing | 33,000.00 | 12,000.00 | 10,266.67 | 2,750.00 | 25,016.67 | 75.81% | 7,983.33 | |

FIG. 12B

SC – Third Application for Payment

| | A | B | C | D | E | F | G | H | I |
|---|---|---|---|---|---|---|---|---|---|
| | | | | WORK COMPLETED | | MATERIALS PRESENTLY STORED (NOT IN D OR E) | TOTAL COMPLETED AND STORED TO DATE (D+E+F) | BALANCE TO FINISH (C - G) | RETAINAGE (IF VARIABLE RATE) |
| ITEM | | DESCRIPTION | SCHEDULED VALUE | FROM PREVIOUS APPLICATION (D+E) | THIS PERIOD | | | | |
| 1 | | Copper Pipe | 10,000.00 | 6,000.00 | 4,000.00 | 0.00 | 10,000.00 | 0.00 | |
| 2 | | PVC Pipe | 8,000.00 | 4,500.00 | 3,500.00 | 0.00 | 8,000.00 | 0.00 | |
| 3 | | Labor | 12,000.00 | 8,000.00 | 4,000.00 | 0.00 | 12,000.00 | 0.00 | |
| | | | 30,000.00 | 18,500.00 | 11,500.00 | 0.00 | 30,000.00 | 0.00 | |

1270

GC – Third Application for Payment

| | A | B | C | D | E | F | G | H | I |
|---|---|---|---|---|---|---|---|---|---|
| | | | | WORK COMPLETED | | MATERIALS PRESENTLY STORED (NOT IN D OR E) | TOTAL COMPLETED AND STORED TO DATE (D+E+F) | BALANCE TO FINISH (C - G) | RETAINAGE (IF VARIABLE RATE) |
| ITEM | | DESCRIPTION | SCHEDULED VALUE | FROM PREVIOUS APPLICATION (D+E) | THIS PERIOD | | | | |
| 100 | | Plumbing | 33,000.00 | 22,266.67 | 10,733.33 | 0.00 | 33,000.00 | 0.00 | |

| GCPay | Project Center | Project Detail | Main | Layout |

Create General Contractor Schedule of Values

Company: Example Construction     Project: Example Project 1(1)

502— Contract Start Date: 01/01/2001     Contact for: [Example Project] —501

To Owner:                    From:
504— Example Owner One    503— Example Construction    —550
     123 Main Street              123 Main Street
     Anytown, VA 23233           Anytown, VA 23233

505— Retainage:

% of Stored Material:            .05
                           Format: .99
   % of Completed Work:             .05
                           Format: .99
   Maximum Retainage Unit:      20000.00
                           Format: 9999999999.99

508    509    551    552   553    510         512   511

Item No.                              Scheduled Value Remove Index 1
                                                    2
                                                    3
                                                    4
                                                    5
                                                    6
                                                    7
                                                    8
                                                    9
                                                   10
                                                   11

Contract Sum:  521           N/A

Add [1] more lines   [Add GC Item(s)] —522

523              524  [Remove GC Item(s)] —520
    Insert [1] line(s) after Index [1]  [Insert Item(s)] —525

530— [Create] [Cancel] —531

| | | | | | From Inception to March 31, 2008 ... | | |
|---|---|---|---|---|---|---|---|
| A | B | C | D | E | F | G | H |
| Job No. | Job Name | Contract Amount | Est. Gross Profit | Revenues Earned | Total Cost Incurred | Total Est. Costs | Gross Profit |
| 1 | Example Project 1 | $14,896,746 | $ 700,000 | $14,859,886 | $14,161,618 | $14,196,746 | $ 698,268 |
| 2 | Example Project 2 | $40,447,718 | $2,000,000 | $33,528,024 | $31,870,179 | 38,447,718 | $1,657,845 |

2300b

| ... From Inception to March 31, 2008 | | | | Six Months Ended March 31, 2008 | | |
|---|---|---|---|---|---|---|
| I | J | K | L | M | N | O |
| Billed to Date | Est. Cost to Complete | Cost & Est. Earnings in Excess of Billings | Billings in Excess of Cost & Estimated Earnings | Revenue | Cost | Gross Profit |
| $14,812,228 | $ 35,128 | $47,657 | -- | $1,917,145 | $1,831,590 | $ 85,555 |
| $34,038,468 | $6,577,539 | -- | $510,444 | $9,849,350 | $9,364,785 | $484,565 |

FIG. 23

ADMINISTERING CONTRACTS OVER DATA NETWORK

This application is a divisional application of application Ser. No. 12/137,680 filed on Jun. 12, 2008, which claims priority to U.S. Provisional Patent Application No. 60/943,746, filed on Jun. 13, 2007, and U.S. Provisional Patent Application No. 61/060,530, filed on Jun. 11, 2008, and is related to U.S. patent application Ser. No. 10/673,142, filed Sep. 30, 2003, and which claims priority of U.S. Provisional Patent Application No. 60/415,762, filed on Oct. 4, 2002, the disclosures of which are expressly incorporated by reference herein in their entireties.

BACKGROUND OF THE INVENTION

1. Field of the Invention

The present invention relates to the field of contract administration. More particularly, the present invention relates to efficiently administering a construction contract over a commonly accessible data network.

2. Background Information

Administration of a construction contract is a difficult and time consuming task. Typically, the efficiency with which a contract is administered means the difference between a profitable and unprofitable contract performance, especially from the point of view of the general contractor.

The traditional roles involved in procurement and construction of building and other structures include the owner, the architect, the general contractor and the subcontractor. The architect creates the design of the building or structure through a separate contract with the owner. The design and specification of the project are necessarily quite detailed to enable competing entities to accurately prepare estimates for performing the work and to assure the integrity of the finished structure with respect to the conceptualization. The architect will also normally act as a liaison between the owner and the general contractor, assuring that the project is proceeding and payments are made according to the contract. The architect is also responsible for approving any change orders that are submitted for review by the general contractor over the course of the project.

The general contractor is typically selected by the owner and/or architect through a competitive bidding process based on the detailed design of the project. Each prospective general contractor elicits bids or proposals from subcontractors specializing in areas of contract performance, such as site preparation, plumbing, electrical, masonry, roofing and the like. The general contractor prepares its bid or proposal generally using the subcontractors' estimates, together with its administrative overhead and a percentage markup. Typically, the proposal includes an itemized list or schedule of tasks to be accomplished in furtherance of the project, known as line items. The subcontractors likewise prepare their estimates, based on the design documents provided by the architect, by determining materials and labor needed to accomplish the tasks specific to their respective specialties. The subcontractors also factor in their administrative overhead and percentage markup, and provide their proposed schedule in the form of line items. The subcontractor line items do not generally match the general contractor line items, although each of the subcontractor line items must fit within a line item proposed by the general contractor. Possibly, all of a particular subcontractor's proposed labor, materials, overhead and markup may fall within a single line item of the general contractor.

The owner and/or architect awards the contract to the most desirable general contractor, based on any number of factors. For example, the award may be based solely on the lowest bid of a qualified general contractor. Alternatively, the award decision may include consideration of a weighted combination of factors, including price, experience, references, time availability, or any other factor deemed significant by the owner and/or architect. The selected general contractor then enters a contract with the owner and/or architect, essentially committing the general contractor to the proposed price and schedule. The general contractor in turn contracts with each of its subcontractors to commit them to their respective prices and schedules.

As work on the project under the contract proceeds, periodic payments are made to the general contractor and the subcontractors. The progress of the project and the corresponding payments are closely tracked to assure that the owner is not paying for work that has not yet been performed (unless the owner has agreed to allow the general contractor to "frontload" progress payments, as discussed below) and that the general contractor and the subcontractors are being paid for work that has been performed. Tracking the progress is complicated by the fact that dozens of subcontractors, whose activities are coordinated by the general contractor, are performing integrated tasks at various stages of completion. Each request for payment, each change order request, each payment, and their effects on the status of the overall project presents a significant accounting challenge. Further, contracts often provide for retainage, which is a predetermined percentage of payments held back or retained by the owner until the project has been completed to its satisfaction. Therefore, the amount of payments likewise needs to be accurately tracked to protect the agreed upon retainage amount.

Also, various criteria may need to be met before entering a contract or subcontract, or before making payment to a contractor or subcontractor for completed work. For example, a general contractor may not retain a subcontract who is unable to produce an appropriate insurance certificate or requisite license, for example. Also, a final payment may be withheld unless the general contractor and/or subcontractors provide a lien waiver, indicating that no mechanic's liens will be filed against the property once the requested amount of payment is receive. Likewise, proof of various incurred costs may be required, such as a payroll certificate, indicating payment of employees.

Computer programs have been developed to assist owners, architects and/or general contractors track progress and status of construction projects. However, these programs rely on conventional submission of payment requests and require manual data entry in order to function properly. There currently is no efficient way in which the various contracting parties can efficiently communicate and exchange data relating to the status of contract performance, submission and approval of payment requests, submission and approval of change orders, and the like.

The present invention overcomes the problems associated with the prior art, as described below.

SUMMARY OF THE INVENTION

The present invention relates to a computer-based method for administering a construction contract, in which all parties to the contract (and any associated subcontracts) access a common server over a data network, such as the Internet, and provide contract schedules and requests for payment based on performance of work in accordance of the schedules.

An aspect of the present invention provides a method for administering performance of a contract over a data network. The method includes storing a lien waiver; receiving an application for payment over the data network from a contract participant based on performance under the contract; and retrieving the stored lien waiver and sending the retrieved lien wavier to the participant via the data network upon approval of the application for payment. The method may further include inserting at least one data tag in the lien waiver prior to storing the lien waiver, and uploading the lien waiver, including the at least one data tag, to a web sever via the data network. The uploaded lien waiver may be stored in a database accessible by the web server.

Another aspect of the present invention provides a method for administering performance of a project over a data network. The method includes creating a general contract schedule of values relating to the project, the general contract schedule of values having multiple general contract line items, each of which identifies an associated number of units, a cost per unit and a scheduled value based on the number of unit multiplied by the cost per unit. The method further includes receiving at least one subcontract schedule of values via the data network, the subcontract schedule of values having multiple of subcontract line items, and associating the subcontract line items of each subcontract schedule of values and the general contract line items of the general contract schedule of values. At least one subcontract application for payment is received via the data network, the subcontract application for payment including the subcontract line items. The general contract line items, including the associated number of units, are updated based on information in the associated subcontract line items received in the subcontract application for payment. A general contract application for payment is created based on the updated contract line items.

Another aspect of the present invention provides a method for administering performance of a project. The method includes retrieving contract administration data corresponding to the project from a web server over a first data network, the contract administration data including a schedule of values having multiple line items; retrieving accounting data corresponding to the project from an accounting system over a second data network, the accounting data including a job file having a multiple job items; and mapping the contract administration data to the accounting system data. The mapping includes matching a line item of the schedule of values with at least one job item of the job file. The method may further include updating the accounting data based on a change order and subsequently updating the contract administration data based on the updated accounting data uploaded to the web server.

Another aspect of the present invention provides a method for administering performance of a contract over a data network. The method includes electronically storing at least one document relating to the contract in a database; creating one of a schedule of values, identifying work to be performed under the contract, and an application for payment, identifying work completed under the contract, at a server in the data network; selecting the at least one document from the database; and uploading the selected document from the database to the server. The uploaded document is attached to the schedule of values or the application for payment, and the schedule of values or the application for payment is submitted from the server to a party under the contract over the data network. Notes may be added to the selected document prior to uploading the selected document from the database.

Another aspect of the present invention provides a method for administering performance of a project over a data network. The method includes creating a schedule of values relating to the project at a web server in the data network and providing an estimated time of performance for the schedule of values to be completed. The method further includes receiving at least one application for payment over the data network applicable to the schedule of values; updating the schedule of values based on the at least one received application for payment; determining an actual time of performance based on the updated schedule of values; and automatically comparing the actual time of performance with the estimated time of performance to track progress of the project. Each of the estimated time of performance and the actual time of performance may be divided into corresponding time periods. Also, a graph may be automatically generated, e.g., substantially at the same time, including a first line showing the estimated time of performance and a second line showing the actual time of performance. The graph may be displayed at a graphical user interface over the data network.

Another aspect of the present invention provides a method for administering performance of a project over a data network. The method includes creating a project profile and assigning roles to a first participant and a second participant, at least the first participant having an associated subsidiary. The method further includes creating a general contract schedule of values relating to the project for the first participant, the general contract schedule of values having multiple general contract line items; receiving at least one subcontract application for payment via the data network from the second participant, the subcontract application for payment including subcontract line items corresponding to at least one of the general contract line items; and updating the general contract line items based on the corresponding subcontract line items received in the at least one subcontract application for payment. The at least one subcontract application for payment is approved, where both the first participant and the subsidiary are authorized to approve the at least one subcontract application for payment.

Yet another aspect of the present invention provides a method for generating a work in process report relating to performance of a contract over a data network. The method includes creating a schedule of values including multiple line items corresponding to work to be performed under the contract; receiving at least one first application for payment via the data network, the application for payment having costs associated with at least one line item of the schedule of values; and creating a second application for payment based on the at least one first application for payment and the schedule of values. The second application for payment is submitted for payment via the data network. The method further includes automatically populating at least one data field in the work in process report with cost information relating to the at least one first application for payment; receiving an estimate of total costs, including at least one additional cost item not included in the at least one first application for payment; and automatically calculating an estimated cost of completion based on subtracting the cost information from the estimate of total costs.

The various aspects and embodiments of the present invention are described in detail below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 3 is a flowchart depicting an exemplary process by which the general contractor creates a project, according to an aspect of the present invention;

FIG. 4 is a flowchart depicting an exemplary process by which the general contractor creates a schedule of values, according to an aspect of the present invention;

FIG. 5 is an exemplary web page for creating a schedule of values, according to an aspect of the present invention;

FIG. 6 is an exemplary web page showing a schedule of values, according to an aspect of the present invention;

FIG. 7 is an exemplary web page for associating subcontractor schedules of values with a general contractor schedule of values, according to an aspect of the present invention;

FIG. 8 is a flowchart depicting an exemplary process by which a subcontractor creates an application for payment, according to an aspect of the present invention;

FIG. 10 is a flowchart depicting an exemplary process by which a contractor creates an application for payment, according to an aspect of the present invention;

FIG. 11 is an exemplary web page for submitting a subcontractor application for payment, according to an aspect of the present invention;

FIG. 12A-12C are exemplary spread sheets indicating corresponding application for payment submissions by a subcontractor and a general contractor, according to an aspect of the present invention;

FIG. 17 is an exemplary web page for providing unit pricing in a schedule of values, according to an aspect of the present invention;

FIG. 23 is an exemplary spread sheet indicating work in progress reports, according to an aspect of the present invention.

DETAILED DESCRIPTION OF EMBODIMENTS

As stated above, the present invention is directed to efficiently administering a construction contract using a server accessible by the parties to the contract and/or the project participants over a data network, such as the Internet. The contract schedules, as well as the requests for payment based on performance of work in accordance with the schedules, are provided over the Internet, from any client capable of interfacing with the Internet.

Figure 1:
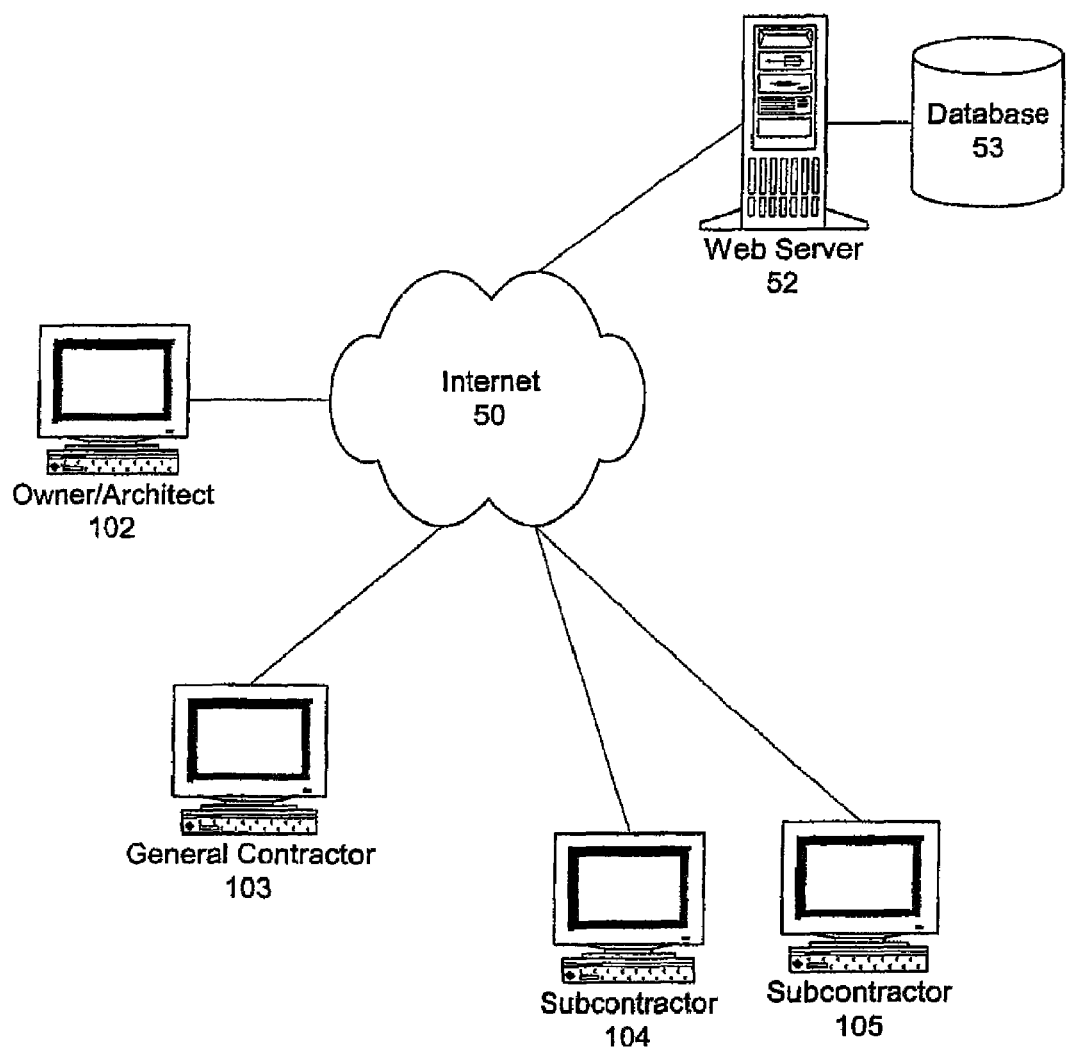
FIG. 1 is a block diagram showing an exemplary network of web clients accessing a common web server, according to an aspect of the present invention.

FIG. 1 depicts an exemplary network of users according to an embodiment of the present invention. The parties to the contract and the project participants are depicted as web clients for the owner/architect 102, the general contractor 103, and the subcontractors 104 and 105. Each of the web clients 102-105 communicates with a web server 52 over a packet switched data network, such as a public Internet 50. The web server 52 has an associated database 53, which may be internal to the web server 52 or a separate database. It is understood that the invention may be implemented over any common data network accessible by the project participants without departing from the spirit and scope of the present invention.

Software implementing the contract administration program resides on the web server 52. In an embodiment of the invention, the software is GCPay®, available from Hart Business Solutions. The software may be based on any known programming languages and techniques, including object oriented programming, that enables the web server 52 to reliably interface with the web clients 102-105 and to execute the steps of the contract administration program that is the subject of the present invention. The web server 52 may operate running any known operating system and associated software, including, for example, the Linux or Microsoft Windows operating system and the Apache web server software, available from the Apache Software Foundation, or the Jigsaw web server software, available from World Wide Web Consortium (W3C).

Each of the depicted web clients 102-105 includes a graphical user interface, which incorporates a web browser, such as Microsoft Internet Explorer, available from Microsoft Corporation, Netscape Navigator, available from Netscape Communications Corporation, or Foxfire, available from Mozilla Corporation. The web clients 102-104 may be any device capable of communicating over the Internet, such as a personal computer (PC), a laptop, a personal digital assistant (PDA), an Internet compatible wireless telephone, or the like. In an exemplary embodiment, the web clients 102-105 are implemented with IBM Pentium based PCs, running the Linux operating system, available from, for example, Free Software Foundation, Inc., or the Microsoft Windows operating system, and running web browser software, such as Microsoft Internet Explorer, Netscape Navigator or HotJava, available from Sun Microsystems, Inc. The web clients 102-105 do not require special software to interact with the web server 52, other than the conventional web browsers.

Typically, the general contractor takes the lead in administering a contract. The general contractor must fulfill numerous obligations with respect to the contract, including developing the initial proposal for performing the project, executing a general contract with the owner, retaining and managing subcontractors, overseeing contract performance, managing change order requests, periodically submitting requests for payment and interfacing with the owner and/or architect throughout performance of the contract. Accordingly, it is anticipated that the general contractor would be the entity responsible for initiating and implementing the contract administration program of the present invention. Therefore, the flowcharts discussed below are directed to the process as implemented by the general contractor, although any other party may initiate and implement the process without departing from the spirit and scope of the present invention.

Figure 2:
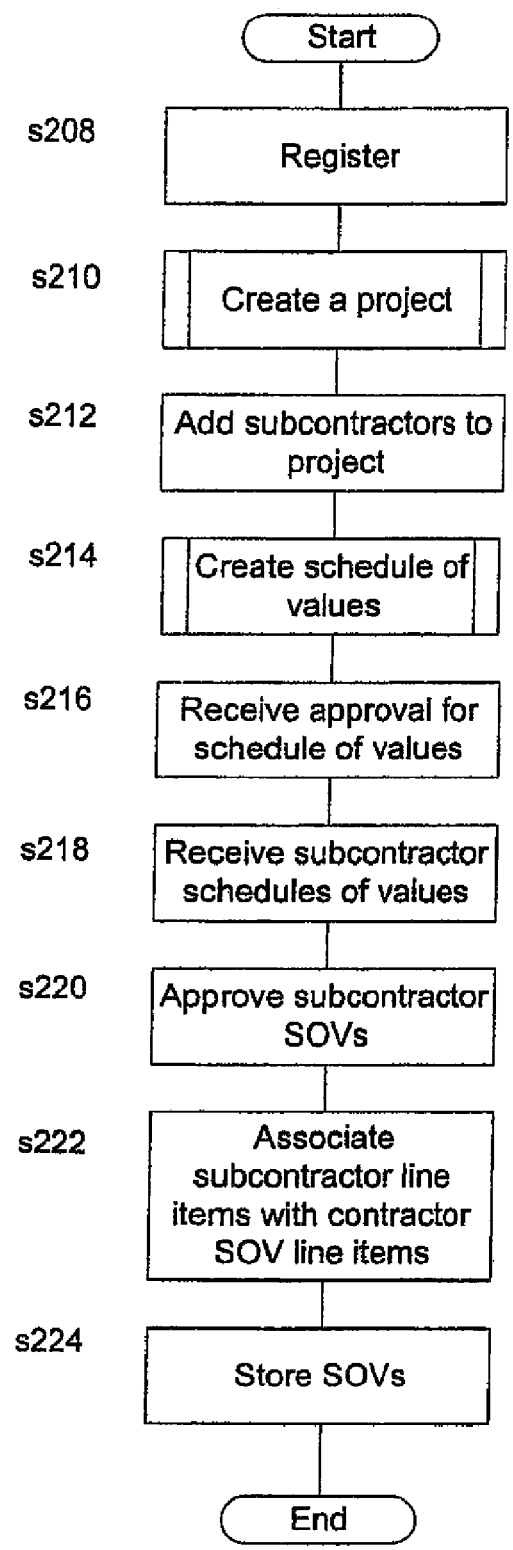
FIG. 2 is a flowchart depicting an exemplary process by which the general contractor initiates a project and establishes the schedules of value, according to an aspect of the present invention.

FIG. 2 is of flowchart depicting an exemplary process by which the general contractor initiates a project and establishes the schedule of values governing contract performance. As stated above, the process is implemented pursuant to a computer program executed at the web server 52. At step s208, the general contractor registers with the contract administration program at the web server 52. The general contractor simply accesses the Internet 50 from the general contractor web client 103 and enters the domain name for a web site operated at the web server 52, such as www.gcpay.com. The general contractor web client 103 and the web server 52 interact through the Internet 50 in a known manner. For example, in an embodiment of the invention, logic is executed by the web server 52, which is accessed over the Internet 50.

The information received by the web server 52 is responsive to prompting by the web server 52, which is programmed in a form reasonably calculated to elicit the desired information. For example, the web server 52 may display a table or form having blank fields that the general contractor fills in based on the identity of each field. Alternatively, the web server 52 may be programmed to request information through discrete fields consecutively displayed in a succession of web pages.

The registration process initially involves registering the general contractor company, which includes receiving basic information about the general contractor, including, for example, the company name, telephone number, mailing address, federal tax ID number, and the like. The basic information may further include other pertinent information, such as small or disadvantaged business status. Also, the identity of a company administrator is entered. The company administrator has the capability and necessary permission to perform numerous proprietary functions in the contract administration program. For example, in an embodiment of the invention, only the company administrator is able to register the general contractor with the contract administration program, create and delete projects and assign other company permissions, discussed below. Therefore, in an embodiment of the invention, the company administrator is identified through a user ID number and a password, in addition to the company administrator's name, for example. The security measures provide protection from unauthorized access to proprietary contract performance data, although other user permissions are able to access certain sets of data relating to the contract.

In an embodiment, the contract administration program enables the company (e.g., the general contractor) to identify associated subsidiaries that may participate in construction projects. The subsidiaries may be linked with the parent company during the registration process, so that a new company does not need to be created and registered every time a subsidiary is used. In an embodiment, only the company administrator is able to add subsidiary companies. A subsidiary is added to a project using essentially the same steps as adding any other company (e.g., subcontractor) to the project. For example, the subsidiary company registration includes receiving basic information, such as the subsidiary company name, telephone number, mailing address, federal tax ID number, small or disadvantaged business status, and the like.

The database 53 may be searched with respect to subsidiaries and other companies, for example, by inserting the company name in a search box of a search web page.

Using one login and password, approved users are able to access the parent and related subsidiary companies. In an embodiment, users (including the administrator) associated with the parent company automatically have the same status with respect to each associated subsidiary company. However, users created and given certain permission in a subsidiary company are not automatically users in the parent company or in other subsidiary companies of the parent company. Rather, they must be invited to the parent separately from the subsidiary. Once a subsidiary has been associated with the parent and added to a project, the associated users of the subsidiary may access the project using the normal login and password.

In addition, information directed to the general contractor's capabilities and qualifications may be included. For example, scanned or electronic copies of the general contractor's insurance certificates, surety bonds, time cards, certified payroll, contractor licenses, work permits, invoices, letters of reference, project portfolios, and the like, may be stored, e.g., in the database 53 or the web server 52, in association with the general contractor. The same types of information may likewise be stored in relation to subcontractors, which register separately, or which are identified and maintained in the general contractor's database.

Further, documentation used by the general contractor may be stored in association with the general contractor information. For example, the general contractor may have a standard lien waiver form or other documentation that it requires its subcontractors to use. The documentation may be logically attached to schedules of value and/or applications for payment. Also, the documentation may be in electronic form, such as a word processing formatted document having fields which may be completed electronically, and which may include an electronic signature or other electronic indication of agreement with the contents. Alternatively the documentation may be in scanned form, such as a PDF file of a scanned document that has been completed and/or signed. Attaching documentation to be submitted with schedules of values and/or applications for payment are discussed further with respect to FIGS. 15 and 16, below.

In an embodiment, lien waivers, in particular, may be created by the general contractor and uploaded to the database 53, where it is accessible for use one various projects. Because the general contractor creates the document, the lien waiver may include whatever specific terms and conditions the general contractor (and/or the owner/architect) require for a particular job or regarding a particularly type of work. The general contractor may upload multiple types of lien waivers, which are anticipated to be used under different circumstances. For example, the general contractor may prefer to use different types of lien waivers depending on the identity of the owner/architect, the type of work being performed, the identity of the subcontractor, the type of payment, etc. Also, the general contractor may create and upload conditional and unconditional lien waiver, where the subcontractors must execute the unconditional lien waiver with respect to final payment. Once the lien waivers are created and uploaded, they may be accessed and used repeatedly by the participants and/or be automatically identified and provided in response to applications for payment, as discussed below. An application for payment may require more than one type of lien waiver.

Figure 13:
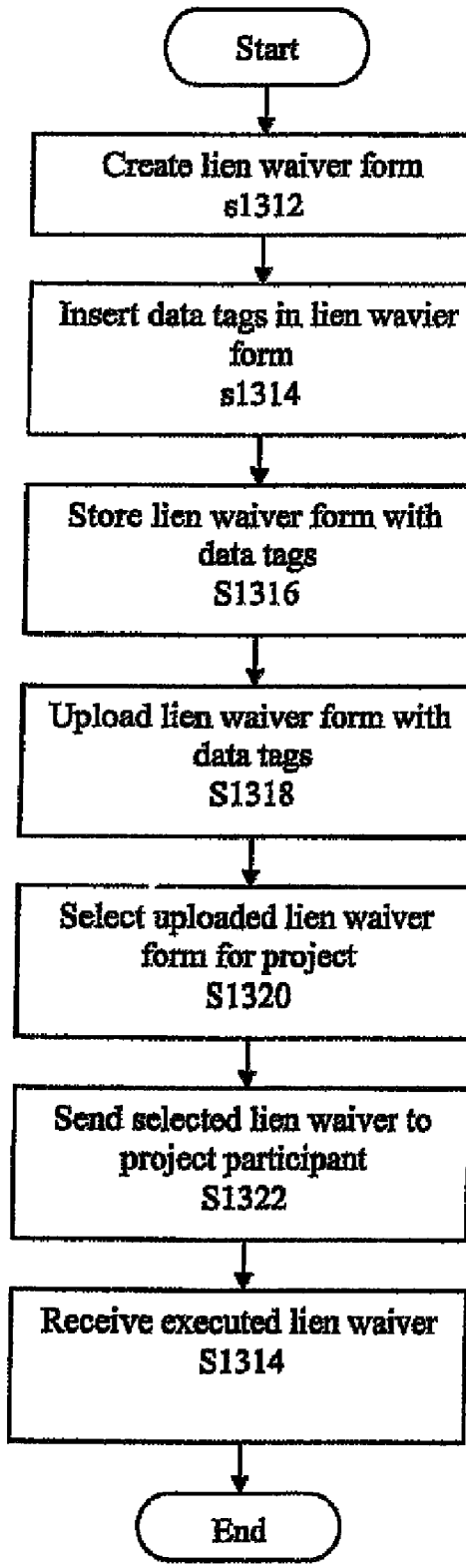
FIG. 13 is a flowchart depicting an exemplary process by which a lien waiver form is provided, according to an aspect of the present invention.

FIG. 13 is a flowchart depicting an exemplary process by which the general contractor creates and uses lien waivers, according to an aspect of the present invention. At step s1312, the general contractor drafts and stores a lien waiver in a word processing or data format, such as a Microsoft Word document or as a rich text format (RTF) document. Because the general contractor creates the lien wavier, it determines the language and various terms and conditions of the lien waiver to its satisfaction. Alternatively, the general contractor may use (or be required by the owner/architect to use) a standardized lien waiver form.

Figure 14:
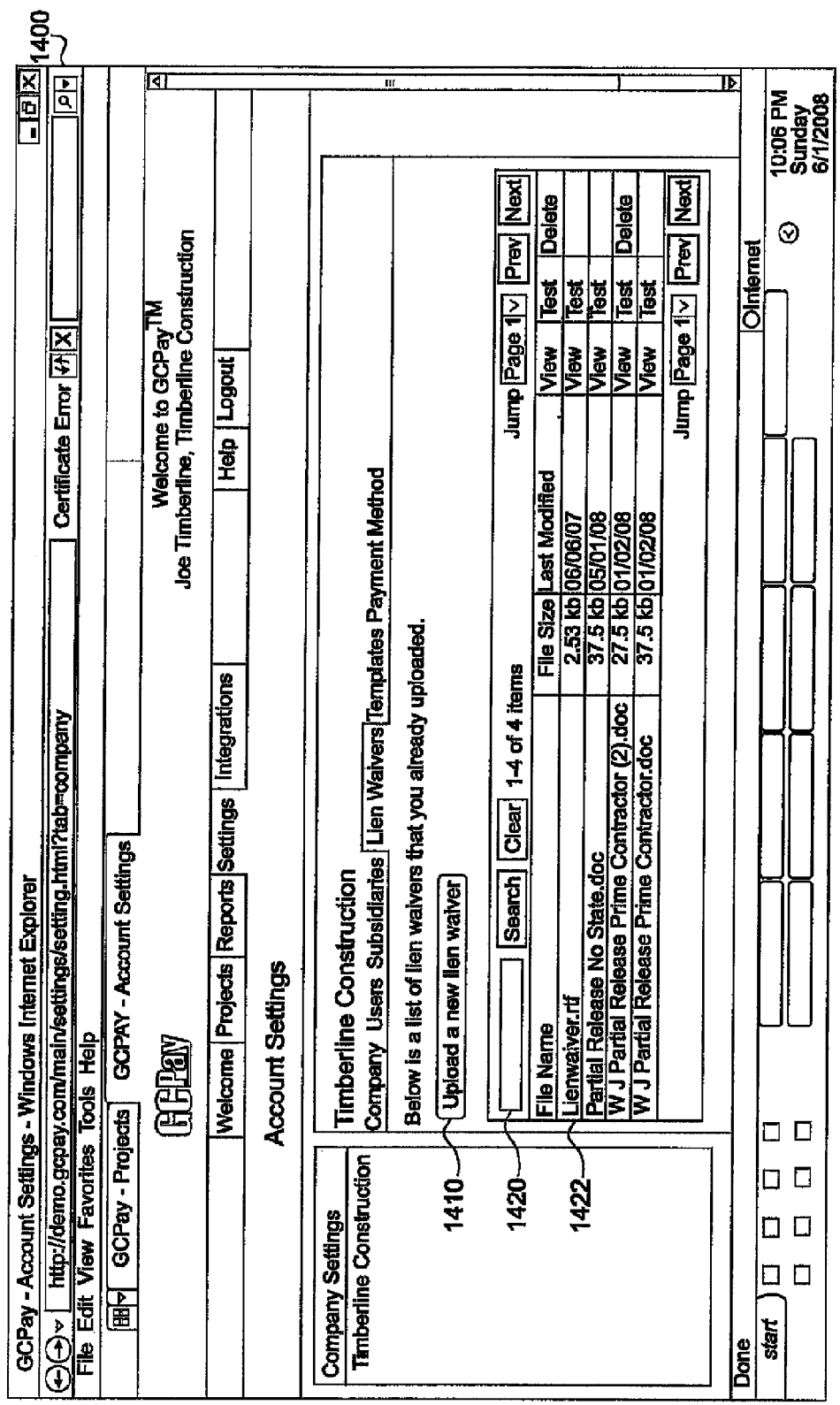
FIG. 14 is an exemplary web page for providing a lien wavier, according to an aspect of the present invention.

At step s1314, data tags are inserted in the lien waiver form. The data tags enable the lien waiver forms to be automatically completed with respect to projects, subcontractors, dates, etc., for more efficient use. For example, the general contractor may replace certain key words on the lien wavier form with appropriately corresponding data tags. The following list provides examples of data tags that may be used to customize the lien waiver forms:

${project_name}—name assigned to the project
${project_number}—number assigned to the project
${project_location}—location of the project
${date}—current date
${afp_number}—application for payment number
${application date}—date of the application for payment
${period_to}—date through which the application for payment runs
${total_due}—total due for the given application for payment
${owner}—company providing the lien waiver (e.g., the general contractor)
${owner_address1}—company address 1
${owner_address2}—company address 2
${owner_city}—city in which the company is located/incorporated
${owner_state}—state in which the company is located/incorporated
${owner_zip}—zip code in which the company is located/incorporated
${contractor}—contractor or subcontractor name
${contractor_address 1}—contractor/sub address 1
${contractor_address2}—contractor/sub name
${contractor}—contractor/subaddress 2
${contractor_city}—city in which the contractor/sub is located/incorporated
${contractor_state}—state in which contractor/sub is located/incorporated
${contractor_zip}—zip code in which the contractor/sub is located/incorporated At step s1316, the lien waiver form, including the data tags, may be stored, for example, in Word or RTF format. The lien waiver may be stored locally at the general contractor's computer (e.g., the web client 103). At step s1318, the lien waiver form is uploaded to the web server 52 and/or the database 53 from the web client 103 for use during administration of the contract. FIG. 14 is an exemplary web page 1400 for uploading a previously created and stored lien waiver form. The general contractor may navigate to the lien waiver web page 1400 through a Welcome or Main page of the contract administration program on the web server 52. Once the lien waiver web page 1400 is accessed, an "upload lien waiver" button 1410 may be selected, which enables the user to browse files for the previously created and saved lien wavier form (e.g., steps s1312-s1316). Once the lien waiver form is selected, uploaded to the web server 52 and/or stored in the database 53, a pop-up may appear indicating the lien waiver has been successfully uploaded. The lien waiver form is automatically included in the list of lien waiver forms 1422 available to the contract administration program. The user is then able to search for various lien waivers using the "search" field 1420.

Once the lien waiver is uploaded, it is available for use on any project. For example, at step s1320, the lien waiver may be added to a designated project during project setup. The general contractor accesses the contract administration web site on the web server 102 through the Internet 50. From an initial web page, such as a Welcome or Main page, the general contractor may click on a lien waiver tab to access the lien waiver web page 1400, and select the lien waiver from the lien waiver form list 1422, as discussed above.

Once a lien waiver form is associated with a project, the contract administration program automatically provides the lien wavier to a subcontractor or other project participant at step s1322 once a corresponding application for payment is approved (as discussed below). For example, the contract administration program may automatically generate the identified lien waiver form and email it to the subcontractor to be executed. In other words, the contract administration program may automatically provide a link to the application for payment, so that the lien waiver is electronically sent based on one or more data tags. Alternatively, the general contractor may be prompted to generate the lien wavier form after approving the request for payment.

Once the subcontractor receives the lien wavier form, e.g., at the web client 104, the lien waiver may be printed out, signed and returned to the general contractor, by email or other delivery method. When the general contractor receives the signed copy, an indication of receiving the lien waiver must be entered for tracking purpose. Alternatively, the general contractor allows the subcontractor to electronically accept the terms and conditions of the lien waiver, the acceptance being automatically forwarded to the web server 52 for tracking. Regardless, the general contractor receives the executed lien waiver form at steps s1324.

In an embodiment, the contract administration program will prevent subsequent applications for payment submitted by the same subcontractor from being approved until it is noted that a previously sent lien waiver has been executed and returned. For example, the contract administration program may provide an alert to the general contractor when the general contractor attempts to approve the next application for payment.

Lien waivers may be routinely viewed, tested and removed from the lien waiver web page 1400 of the contract administration program. Also, in an embodiment, sample lien waivers are available to the users, which may be selectively modified (using the web client 103) and stored in the database 53 in association with the general contractor information in essentially the same manner as discussed above.

After the initial company registration, the general contractor receives a Welcome web page or home page whenever it accesses the web server 52. Users in addition to the company administrator may be added or deleted, together with various levels of permission. For example, the user permissions may include a project manager, a company primary contact, a company auditor and a project creator. The project manager is able to add and remove project users and to edit project information and settings. The company primary contact, which may coincide with the company administrator, has the ability to receive email notifications when project events occur, including submitting and reviewing schedules of values, applications for payment and change order. The project auditor can view audit trails for the project. The project creator has the ability to build and edit new projects. The various user permissions may all be granted to the same person, each to a different person, or any combination of people, according to the company administrator's discretion.

At step s210 of FIG. 2, a user from the general contractor (e.g., the project creator or company administrator, identified above) creates a new project by initially accessing the web server 52 from the general contractor web client 103 over the Internet 50. It is assumed that the general contractor has already been awarded the contract based on a previously submitted bid or proposal, based in part on various bids and proposals submitted by the subcontractors. Therefore, certain contractual terms are set, for example, the overall contract price, the general contractor's percentage mark-up, retainage (if any), procedures for change orders, and other typical contract terms and conditions.

The user creates a new project by selecting a "create new project" button, for example, on an introductory web page of the contract administration program. The web server 52 accordingly transmits a new project web page to the web client 103 to direct the user through the project creation process.

In order to create a new project, the general contractor first creates a project profile, as indicated in step s310 of FIG. 3. Creating a project profile is necessary so that the relationships among the project participants are delineated to enable the exchange of information through the web server 52. Creating a project profile entails entering basic information regarding the project. For example, the project profile may include a project name, a project number, a contract start date and the name of the general contractor. The general contractor may have multiple projects which it tracks over the Internet 50 using the contract administration program of the present invention, so the project profile enables the general contractor to distinguish among the various projects.

At step s312, the general contractor user assigns roles to the participants of the project. The project participants are referred to as "companies" for purposes of simplifying the explanation, although it is understood that the project participants may be any legal entity capable of contracting to perform work on the project, including sole proprietors and partnerships. In an embodiment of the invention, at least one company must be assigned to each role of the project, i.e., an owner, an architect and a subcontractor, in addition to the general contractor. In an embodiment of the invention, the owner and the architect are the same company because of the overlap in duties between the two. For example, the architect typically reviews and approves schedules of values, applications for payment and change orders, while the owner typically approves release of funds, although these responsibilities may be handled differently.

Each of the companies assigned a role must exist in the database 53 of the web server 52. In fact, a general contractor may perform multiple projects for the same owner/architect or using the same subcontractors. If a company is not in the database 53, e.g., the company is not registered with the GCPay® service, it must be added or a proxy is created to substitute for the missing company. In alternative embodiments, the company administrator of the general contractor or an administrator of the contract administration program may create the proxy.

In order to create a proxy, the general contractor company administrator, for example, registers the proxy company in the same manner in which a company would register itself with the contract administration program, but marks the company as a proxy. The database 53 stores the name and other information of the company for which a proxy is created. A web page listing, for example, of the project participants indicates each company that is a proxy.

When the general contractor project manager adds the proxy company to the project, the system automatically adds the general contractor's company administrator as the initial project manager of the proxy project company, which is created in the same manner as any normal registered company being assigned to the project by the project manager or other qualified user of the general contractor. The general contractor company administrator may access a listing of proxy companies at the web server 52 from the web client 103, for example. The general contractor company administrator is automatically the company administrator for each of the proxy companies, as well. The company administrator may therefore assign permissions and the like with respect to the other proxy users (e.g., also from the general contractor) for the proxy companies. The assigned users perform all of the functions of the subcontractors corresponding to the proxy companies, based on information supplied by the represented company, typically a subcontractor. When a proxy company needs to become a real company, e.g., the proxy subcontractor eventually subscribes to the GCPay® program, there is handover to the real company, coordinated by the administrator of the contract administration program.

The significance of a proxy from the general contractor point of view is that the general contractor must enter the contract performance data on behalf of the proxied company. For example, a subcontractor that subscribes to and participates in the GCPay service enters performance data directly to the web server 52 from the subcontractor web client 104 or 105. The performance data includes, for example, a schedule of values, applications for payment, change orders and the like, as discussed below. However, a subcontractor that is not registered with the GCPay service provides contract performance data through conventional means, and the general contractor then enters the data into the contract administration program at the web server 52 on behalf of the subcontractor. It is self-evident that the present invention is most efficient whenever all of the project participants are likewise registered with the GCPay service.

The general contractor then assigns user permissions at step s314. Included among the user permissions are company user permissions within each participating company and project user permissions with respect to the overall project. In an embodiment of the invention, the company user permissions include the following: a company administrator, who is able to edit company information and is the first point of contract for automatic email notifications, discussed below; a company primary contact, who is able to receive email notifications; company auditor, who is able to view an audit trail of changes or edits to company information and user information; a company user manager, who is able to edit other users' information within their same company and lock/unlock users from accessing the contract administration program; and a project creator, who is able to create projects.

Only one party to the contract, typically the general contractor, should have a project creator in order to avoid duplicative efforts for one project. Also in an embodiment of the invention, the project user permissions include the following: a project manager, who is able to edit project information, including users, and is the first point of contact for automatic email notifications; a primary contract, who is able to receive email notifications of project events; a project auditor, who is able to view an audit trail of changes or edits to project related information; a schedule of values editor, who is able to create and edit the project schedule of values and change orders, e.g., for the general contractor; an application for payment editor, who is able to create and edit the project applications for payment; a schedule of values reviewer, who is able to review and approve or reject the subcontractors' schedules of values, as well as the general contractor change orders, and an application for payment reviewer, who is able to review and approve or reject the subcontractors' applications for payment.

In an embodiment of the invention, permissions are assigned using a drop-down window of employees of the general contractor. The general contractor selects an employee and then clicks on the project permission categories assigned to the selected employee. The process is repeated for each employee associated with the project. Permission may likewise be removed from employees, for example, by clicking a remove icon next to the user's information. The registered subcontractors or other party to the project is responsible for assigning their respective user permissions.

At step s316, the general contractor finishes creating the project by entering the project settings. The project settings include any administrative items applicable to performance of the contract. For example, under the project settings, the general contractor identifies the company that will review and approve the general contractor's schedule of value, applications for payment and change orders, e.g., the owner and/or the architect. The project settings also include the identity of lien waivers that will need to be executed by the subcontractors, for example, in order to receive payments for on the project, discussed above. The execution may require the documents to be signed, as well as notarized, depending on the requirements. Alternatively, the execution may simply require electronic acceptance of the listed terms and conditions of the lien waiver by the subcontractor. The option of requiring subcontractors to submit lien waivers, as well as acceptable execution methods, may be presented, for example, by providing a check box on the web page. It is understood, though, that the lien waivers may be identified or changed at any time during the course of the project.

For example, to add a lien wavier, the general contractor selects the project from the initial web page, such as a Welcome or Main page, and selects the project setting tab. The project setting page will include a lien waiver tab, which, when selected, lists the lien waivers that were previously uploaded and stored in the database 53, for example, in list 1422 of FIG. 14. In an embodiment, the general contractor may simply place checks or other indications next to the specific lien waiver(s) which is to be included in the project. The general contractor may set up the project such that different types or forms of lien waivers must be provided and executed, for example, based on the subcontractor, the type of work, the status (e.g., non-final or final) of the payment, the location of the work or subcontractor, etc. In an embodiment, the lien wavier(s) selected for a particular project are automatically completed with the project information using data tags, as discussed above.

If the general contractor desires a lien waiver, but has not previously uploaded the lien waiver to the database 53 (or the web server 52), the general contractor may select another option. For example, the general contractor may indicate in the project settings that a lien waiver will be required, and that the subcontractors will return executed paper lien waivers in due course. In this case, the contract administration program will enable tracking of the receipt of the paper lien waiver. For example, when the paper lien waiver option is selected, the contract administration program will prompt the general contract upon receipt of an application for payment (discussed below) as to whether a properly executed lien waiver has been received from the corresponding subcontractor and will prevent approval of the application for payment until the general contractor indicates the affirmative. Once a lien waiver is received, the contract administration program will display an indication to that effect for the general contractor's convenience. Alternatively, the general contractor may upload a lien waiver at any time to be associated with the project, as discussed above with respect to FIG. 13. Also, the general contractor may select the option of having an electronic copy of a selected lien wavier automatically sent to a subcontractor once an application for payment is approved, e.g., by email or through a link from the web server 52.

Regardless of how the general contractor elects to have lien waivers provided, executed and returned, the contract administration program tracks the receipt of appropriate lien waivers. In various embodiments, the contract administration program may prevent approval of a current application for a subsequent (or current) application for payment until the executed lien waiver has been received Of course, the project settings may identify documentation other than (or in addition to) lien waivers, which must be provided by subcontractors a prerequisite for approval and payment of requests for payment. For example, the general contractor may indicate in the project settings that final payments will not be approved until an inspection certificate has been provided (in paper or electronic form) by the requesting subcontractor. Likewise, the general contract may indicate in the project setting that require separate evidence of claimed costs, such as payroll certifications, materials receipts, and the like. Such documentation may be attached, for example, to schedules of values and/or applications for payment, as discussed below with respect FIGS. 15 and 16.

The project settings may be displayed at the general contractor web client 103 as a web page sent from the web server 52. In an embodiment of the invention, the project settings enable the general contractor to determine whether to allow the contract administration program to automatically number line items created by the general contractor in an incrementally ascending order, beginning with the number one. When the general contractor prefers using its own line item numbers, it does not select automatic line item numbering. Another exemplary setting is specifying whether the project includes a variable retainage or a fixed retainage. Variable retainage enables the general contractor to adjust the amount of retainage the owner is able to withhold over the course of the project, typically reducing the retainage nearer completion of the project.

After the settings are entered, the web server 52 sends a web page to the general contractor web client 103 showing everything input to create the project for verification. In an embodiment of the invention, the general contractor is allowed to correct any wrong entries by clicking on a "fix" button, for example. Otherwise, the user clicks on a "create project" button, for example, to accept and program into the contract administration program all of the entered data for the new project. The settings are accordingly stored by the database 53 in association with the project.

Once the project is created, the general contractor is able to access a project web page listing all of the created projects by name or other unique identifier. The general contractor is therefore able to access data on any of its projects by simply clicking on the appropriate icon, retrieving a project detail web page corresponding to the selected project.

At step s212 of FIG. 2, the general contractor adds subcontractors to an existing project. For example, at the project detail web page, the general contractor selects a company role management icon, which causes the web server 52 to display the company role management web page at the general contractor web client 103. The company role management web page displays the existing companies and associated roles, e.g., architect, owner and subcontractor, previously entered by the general contractor at step s312 of FIG. 3. When needed, the general contractor may select a button for adding a subcontractor, or other company, and is queried to enter the name and other information relating to the new subcontractor.

When a new subcontractor is already in the database 53, e.g., the subcontractor has been used on another project and was previously entered into the database 53 when assigning company roles, the general contract may simply identify the subcontractor by name or other identification information. In an embodiment of the invention, the company role management web page includes a drop-down window of all companies and associated roles in the database 53, including subcontractors from all projects, so that the general contractor is able to add a subcontractor to the present project by selecting the desired subcontractor from the subcontractor drop-down window. For example, the general contractor clicks a box next to the desired subcontractor and then associates the selected subcontractor with the present project. Once the new subcontractor is selected, and the subcontractor's company information added to the database 53, if necessary, the general contractor saves the information in association with the project. Of course, new subcontractors, as well as other companies associated with the project, may be added to the project using any variations of the web screens and/or associated commands retrieved from the web server 52 without departing from the spirit and scope of the present invention.

Similarly, the general contractor is able to deactivate project participants. For example, the general contractor web client 103 retrieves the project detail web page from the web server 52. The general contractor is then able to select the company role management icon, which displays all of the contract participants, including the subcontractors associated with the project. In an embodiment of the invention, each subcontractor is listed with corresponding "view" and "deactivate" buttons, for example. Clicking on the view button causes the web server 52 to display a web page containing all of the company information relating to the corresponding subcontractor. Clicking on the deactivate button causes the corresponding subcontractor to be removed from the project, although any previous schedule of values, applications for payment and/or change order information is retained in the project history of the database 53. In an embodiment of the invention, once a subcontractor's schedule of values has been approved, it can no longer be simply removed from the project, and must be deactivated, as described above.

At step s214, the general contractor creates the original schedule of values for the project. In an exemplary embodiment, the general contractor retrieves the project detail web page from the web server 52 at the general contractor web client 103. The general contractor then selects an indication of creating a schedule of values for the project, such as a button labeled "create SOV." Initially, a web page is displayed requesting general information regarding the contact, including percentages of retainage for stored materials and completed work, the maximum retainage limit and the number of lines needed for the general contractor's original schedule of values. The retainage amounts are negotiated and agreed upon by the owner and the general contractor pursuant to the general contract. The percentage of retainage for stored materials and completed work, as well as the maximum retainage limit are entered by the general contractor at step s412 of FIG. 4, which is a flow diagram of creating the general contractor's schedule of values.

The general contractor clicks a "create" button, for example, in response to which the web client 103 displays a general contactor schedule of work web page received from the web sever 52. FIG. 5 provides an example of the general contractor's schedule of values web page 500, according to an embodiment of the present invention. The web page 500 includes basic contract information, such as the name of the project 501, the start date 502, the general contactor's name and address 503 and the owner's name and address 504. The web page also displays the retainage information 505 entered by the general contractor at step s412. In the exemplary embodiment, the stored material retainage is five percent, the completion of work retainage is five percent and the maximum retainage limit is $20,000. In other words, for each application for payment submitted by the general contractor during performance of the project, the owner respectively retains five percent of each value submitted for stored materials and completed work, up to a total of $20,000 over the life of the contract. The retainage is released upon completion of the project and acceptance of the work by the architect and/or owner.

Below the contract information are rows of blank fields corresponding to line items, the number of which was previously identified by the general contractor, as described above. In the exemplary embodiment shown in FIG. 5, each line item includes four columns of information: item number 508, description of work 509, scheduled value 510 and index 511. At step s414 of FIG. 4, the general contractor enters the item number 508, which is a free form field that accepts any combination of alpha or numeric characters corresponding to the particular line item. Alternatively, the general contactor may select automatic numbering, in which case each item number 508 is filled automatically with incremental, ascending numbers.

The contractor enters the description of work 509 at step s416, which is a free form field that accepts any combination of alpha or numeric characters descriptive of the line item. Examples of entries for description of work 509 include "carpeting—labor," "carpeting—materials," "drywall—labor," "drywall—materials," "HVAC—labor," "HVAC—materials," "plumbing—labor," "plumbing—materials," and the like. The contractor may also identify and/or include any documentation required in support of the line item, as discussed above. For example, the schedule of values may logically attach an inspection form that is required to be completed by the appropriate subcontractor when the work is completed. The documentation may be electronic or scanned, and may be previously stored in the database 53, in association with the project and/or the contractor, at the time the project was created. Alternatively, the documentation may be locally stored, e.g., on the web client 103, and uploaded by the general contractor to be attached to the schedule of value. The subcontractor(s) associated with the line item will complete the documentation, or electronically indicate agreement with the terms of the documentation, and return it with a subsequent application for payment, discussed below.

Figure 15:
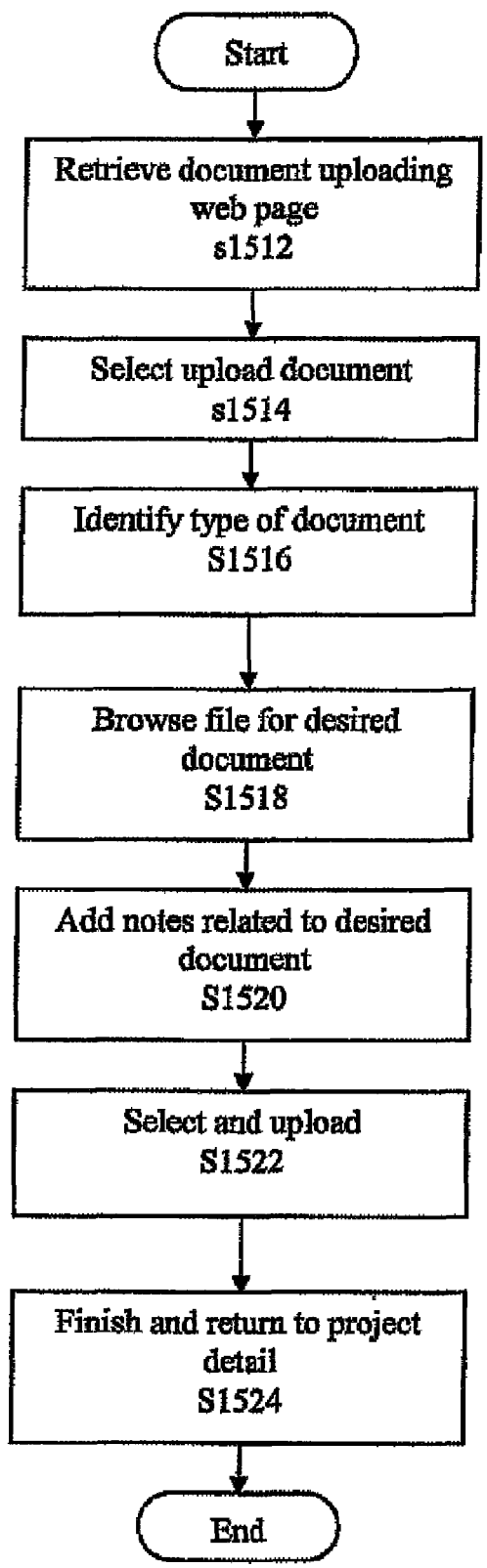
FIG. 15 is a flowchart depicting an exemplary process by which supporting documentation is provided, according to an aspect of the present invention.
Figure 16:
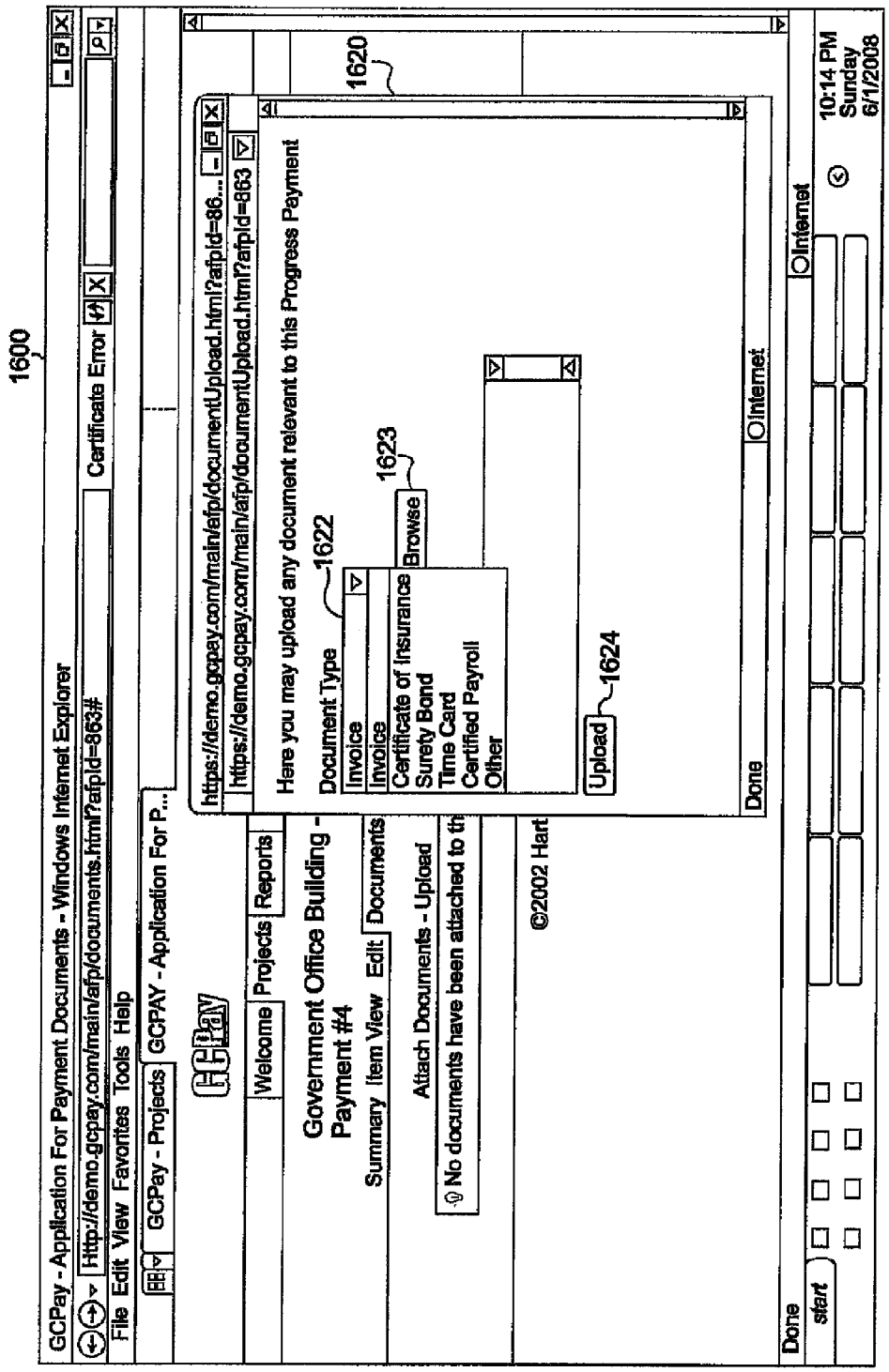
FIG. 16 is an exemplary web page for providing supporting documentation, according to an aspect of the present invention.

For example, FIG. 15 is a flowchart showing the process of uploading a document to be included in a schedule of values (and/or in an application for payment, as discussed below), according to an illustrative embodiment of the invention. At step s1512, after the schedule of values has been created and stored, the general contractor selects a Documents tab to retrieve a document uploading web page at the web client 103 via the web server 52 at step s1512. FIG. 16 is an exemplary web page 1600 for uploading documentation to a schedule of values, to an aspect of the present invention, which may be displayed at step s1512.

At step s1514, an "upload document" button (not shown) may be selected, which causes window 1620 to open. Window 1620 includes a "document type" field 1622, a "browse" button 1623 and an "upload" button 1624. At step s1516, the type of document to be uploaded is entered in "document type" field 1622. In an embodiment, the "document type" field 1622 may include a drop down menu, for example, activated by clicking on a down arrow, which provides a predetermined list of document types. The general contractor may scroll through various types (e.g., invoice, certificate of insurance, surety bond, time card, certified payroll, other), and select the most appropriate description. Of course, although not specifically shown in FIG. 16, a lien waiver (not having data tags) may be listed and selected in the same manner.

At step s1518, the general contractor may browse files for the desired document by clicking the "browse" button 1623. The "browse" button 1623 provides a drop down list of files available on the local computer (i.e., the web client 103). However, it is understood that any other storage media accessible by the web client 103, such as external or networked storage devices, web sites, databases, and the like, may be browsed at step s1318 to obtain the desired document. For example, if an insurance certificate has been previously stored in the database 53, the insurance certificate may be obtained by browsing the database 53. In an embodiment, the general contractor may add notes relating to the selected document at step s1520.

At step s1522, the document is highlighted or otherwise selected, and the selected document and accompanying notes (if any) are uploaded by selection of the "upload" button 1624. The screen will refresh the uploaded document will appear on a list of documents attached to the schedule of values. The "upload document" button may be clicked again to begin the process of uploading additional documents, or the uploading process may be ended, e.g., by clicking a "finish" button, the project name or some other indication of completion, at step s1524. Substantially the same process may be followed to attach a document to an application for payment.

A certificate of insurance is a special case document that can be uploaded by any company and assigned an expiration date by the company. The certificate of insurance is stored at the company or participant level and is not necessarily specific to a schedule of values or applications for payment. In an embodiment, thirty days prior to the expiration date of the certificate of insurance, the company that uploaded the certificate of insurance will receive an electronic notification, such as a pop-up alert at a corresponding web client upon the creation of an application for payment, providing notice of the pending expiration. Likewise, participants contracting with a company having a certificate of insurance within (or beyond) the 30 day period prior to expiration will receive an electronic notification, such as a pop-up alert, on corresponding applications for payment, notifying them that the submitting company's certification of insurance is due to expire, or has expired.

At step s418, the general contractor enters the scheduled value 510 corresponding to the description of work. The scheduled value 510 is a numeric field that accepts a dollar amount scheduled for the particular line item. The format is entered, for example, as xxxxxxx.xx, which is interpreted by the program as $x,xxx,xxx.xx.

In an alternative embodiment, the general contractor may select a "unit pricing" box (not shown) in order to calculate the scheduled value. Unit pricing provides the project participants the ability to bill based on the number of units that are completed to date, as opposed to billing based on a percentage of completion. A unit is a defined measurement, such as square feet, yards, cubic yards, bricks or any other unit of measure the participants agree adequately represent the progress of the project. When using unit pricing, each unit is set on a per line item basis, providing the ability to have multiple units of measure included in any given schedule of vales (or corresponding applications for payment and change orders).

FIG. 17 is an exemplary web page for creating a schedule of values, according to an aspect of the present invention using unit pricing. As shown, when using of unit pricing, the contract administration program may add up to three additional columns on the web page 550. The columns include number of units 551, cost per unit 552 (e.g., in dollars per unit) and description of unit 553 (e.g., unit of measure).

Figure 18:
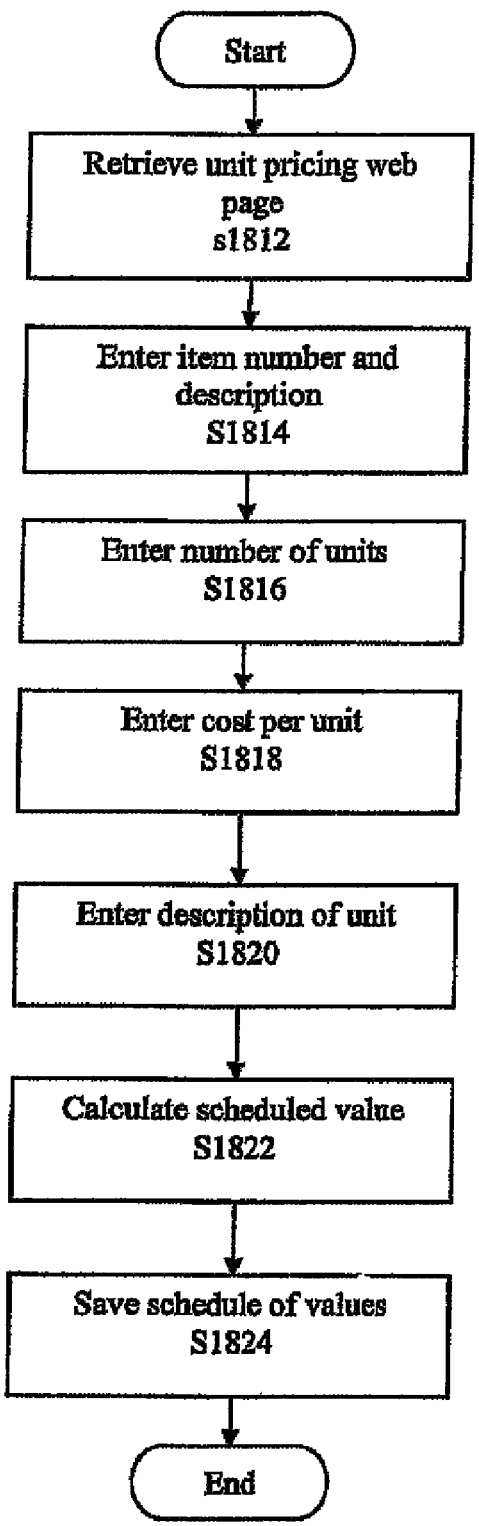
FIG. 18 is a flowchart depicting an exemplary process by which unit pricing is included in a schedule of values, according to an aspect of the present invention.

FIG. 18 is a flowchart depicting an exemplary process by which the general contractor creates a schedule of values, using unit pricing, according to an aspect of the present invention. Although FIGS. 17 and 18 are described with reference to creating a general contractor schedule of values, it is understood that the discussion applies equally to creating of subcontractor schedules of value.

At step s1812, the general contractor selects unit pricing, for example, by clicking a "unit pricing" box (not shown) on the create schedule of values web page, from the web client 103. In response, the web server 52 causes a web page for unit pricing, e.g., as shown in FIG. 17, to be displayed at the web client 103. The general contractor then enters the item number and associated general description in columns 508 and 509 as discussed above, at step s1814. In addition, the general contractor enters the number of units for the line item in column 551 at step s1816, the cost per unit in column 552 at step s1818 and the description of the unit (e.g., square feet, cubic yard, etc.) in column 553 at step s1820. The descriptions of the units may be different for the different line items. In an embodiment, the contact administration program then automatically calculates the schedule value at step s1822, which is entered in column 510 for the particular line item, by multiplying the values in columns 551 and 552. Once all line items have been completed, the schedule of values is saved, e.g., in the database 53, at step s1824.

In alternative embodiments, the schedule of values may have combined unit pricing and percentage pricing, depending on the item number and associated work. For example, the schedule of values web page 550 may be used, and when unit pricing is not desired for a particular line item, columns 551-553 may simply be left blank, and the scheduled value may be manually entered in column 510, as discussed above with respect to step s418 of FIG. 4.

Referring back to FIG. 5, the index number 511, entered at step s420, is simply an incremental, numerical index of each line item, provided automatically in an embodiment of the invention. The index number 511 enables quick and efficient indexing of the various line items, without reference to the item numbers 508. For example, the item numbers 508 are typically coded by specialty, such as 300+ for finishing work, 400+ for HVAC work, 600+ for electrical work and 700+ for plumbing work. The incremental index numbers 511, however, identify each line item incrementally as it appears in the list of line items with no consideration of the specialty.

At step s422, the general contractor determines whether to edit the schedule of values. For example, the web page 500 depicts a fifth column, remove 512, which enables the general contractor to remove the corresponding line item by marking the box and clicking the "remove items" button 520 at step s424. New line items may also be added to the end of the list by entering the number of line items to be added in box 521 and clicking the "add items" button 522. To insert line items between existing line items, the general contractor enters the number of line items to be inserted in box 523, identifies the index number of the line item after which the new line items are to be inserted via box 524 and clicks the "insert items" button 525, for example. When the general contractor clicks on the cancel button 531, all of the entries are deleted.

After all of the line items for the general contractor's original schedule of values have been entered, the general contactor clicks on the create button 530. The result is a completed schedule of values, an example of which is shown in web page 600 of FIG. 6. The contract administration program at the web server 52 calculates the contract sum at step s430 by adding each entry in the scheduled value 510 column of FIG. 5 and displays the result as the contract sum 610 in web page 600.

At step s432, the general contractor submits the original schedule of values to the owner over the Internet 50, for example, by selecting the submit button 612 on the web page 600. For example, the schedule of values is stored in the database 53 and subsequently accessed by the web server 52 for display at the owner/architect web client 102. A box for comments 614 may also be provided on the web page 600, enabling the general contractor to elaborate on any line items requiring further explanation. In addition, supporting documentation may be included with the schedule of values submitted to the owner/architect, such as insurance certificates, licenses, work permits, etc. For example, the supporting documentation may consist of attachments to the web page 600, which may be indicated by a pop-up message, links to other web pages or databases, and the like.

In an embodiment of the invention, the web server 52 generates an email, including the comments, and sends the email over the Internet 50 to the owner/architect web client 102 to notify the owner and/or architect that the schedule of values has been submitted and to seek approval of the comments. In an embodiment of the invention, the email received by the owner and/or architect includes the URL of the web server 52 in a link, so that they may access the web server 52, and the contract administration program, by simply opening the link in the email. The owner and/or architect may then review the general contractor's schedule of values. In this embodiment, the support documentation may also be included as attachments to the e-mail, automatically generated and/or sent to the owner/architect. Again, receipt of an email contain supporting documentation may be indicated by a pop-up message on a web page (e.g., web page 600).

Once the schedule of values has been submitted for approval, the general contractor cannot make changes pending approval. This includes not being able to add or remove subcontractors. Once the schedule of values is approved the general contractor may add or remove subcontractors as discussed above, or seek to change the schedule of values itself by submission of change orders, discussed below.

In the depicted embodiment of the invention, the general contractor may elect to store the completed schedule of values as a template at step s434. For example, when the schedule of values is similar to that of other projects or anticipated projects, saving the schedule of values as a template saves time and effort in the other projects. At step s436, after submitting the schedule of values to the owner and/or architect, the general contractor may enter a template name in a field provided on the redisplayed web page. The template name describes the type of project for which the template is useful, for example, school construction, hospital construction, or the like. The general contractor then saves the template at step s436 to instruct the web server 52 to save the schedule of values, e.g., in the database 53, as a template for future reference. In this embodiment of the invention, the initial general contactor schedule of work web page 500 may include a button labeled "choose template" (not pictured), which enables the general contractor to select a previously stored template, e.g., from a drop-down window, and customize the selected template as necessary for the schedule of values on the new project.

In an embodiment of the invention, the general contractor (as well as the subcontractors) may create a template prior to creating a schedule of values for a particular project. The line items for the template are created and edited in essentially the same manner as described above with respect to creating a schedule of values. Accordingly, the general contractor can build subsequent schedules of values relating to various projects based on the stored template.

Regardless of whether the schedule of values is saved as a template, the process returns to FIG. 2, with respect to approval of the schedule of values. The owner and/or architect review the schedule of values, submitted via the Internet 50. In an embodiment of the invention, the owner and/or architect accesses the web server 52 from the owner/architect web client 102 over the Internet 50 upon receiving notice by email that the schedule of values has been submitted. When the owner and/or architect approves the schedule of values, the owner and/or architect clicks on an approve button, for example, displayed along with the submitted schedule of values on a web page at the web client 102. The general contactor receives notice of the approval at step s216. In an embodiment of the invention, the general contractor receives notice of approval by email, generated by the contract administration program, via the Internet 50. When the owner and/or architect reject the schedule of values, a notice to that effect is sent to the general contractor. No applications for payment or change orders may be submitted until an approval for the schedule of values is received.

At step s218, the general contractor receives the schedules of values from the various subcontractors assigned to the project. Using the web client 103, the general contractor accesses the web server 52 and retrieves the project detail web page. The general contractor clicks on a box labeled "view submitted schedule of values," for example. The web client 103 displays an overview web page of the submitted schedules of values received from the web server 52. The web page lists all of the subcontractors that have submitted a schedule of values, along with the status of each schedule of values, e.g., submitted, viewed, approved or rejected. The overview may also include a subcontract sum, which is the total amount of the submitted subcontract based on the schedule of values.

With respect to the status, "submitted" indicates that the subcontractor has submitted its schedule of values over the Internet 50 to the web server 52, so it is available for the general contractor's review, but the general contractor has not yet looked at the submission. "Viewed" indicates that the general contractor has accessed the web server 52, retrieved the submitted schedule of values for viewing at least once, but has not yet decided to approve or reject the submission. "Approved" indicates that the general contractor has reviewed and approved the corresponding subcontractor's submission. In an embodiment, once the general contractor approves a schedule of values, the state cannot be changed, so any corrections would need to be made by a change order. Therefore, it is to the general contractor's benefit to associate the line items from the subcontractor's schedule of values with the line items from the general contractor's schedule of values, discussed below with respect to step s222, prior to approving the schedule of values to assure that any inconsistencies are addressed prior to final approval. "Rejected" indicates that the subcontractor's submission is unacceptable. If the general contractor had previously associated any line items from the subcontractor's ultimately rejected schedule of values with the line items from the general contractor's schedule of values, these lines are automatically disassociated upon rejection.

The overview web page of the submitted schedules of values may also identify the subcontracted representative who submitted and the general contractor representative who reviewed each of the schedules of values. In an embodiment, when the subcontractor is represented by a proxy company, the overview web page indicates the representative of the general contractor who entered and submitted the schedule of values for the proxy company on behalf of the subcontractor. Accordingly, a schedule of values may be submitted and approved by the same person. As discussed above with respect to step s312 of FIG. 3, the general contractor's representative is previously assigned a role within the general contractor having authority to approve subcontractor schedules of values, e.g., the SOV reviewer.

In response to the general contractor's request to review a selected schedule of values, the web server 52 sends the selected schedule of values, previously submitted by the associated subcontractor (and stored in the database 53) to the web client 103. In an embodiment of the invention, the subcontractor's schedule of values is prepared and submitted in the same general manner as the general contractor's schedule of values, discussed above with respect to FIGS. 4 and 5. Of course, there are differences in the line items because the subcontractors limit their respective schedules of values to their subcontract specialties. Also, the subcontractors provide significantly more detail for the performance of the work under the subcontracts, requiring the general contractor to associate line items from each subcontractor's schedule of values with the appropriate line items from the general contractor's schedule of values, as discussed below with respect to step s222. Of course, the subcontractors' respective support documentation may be included with the corresponding subcontractor schedule of values submitted to the general contractor, which may likewise include insurance certificates, licenses, work permits, etc., as discussed above.

Upon review, the general contractor may accept or reject the submitted schedule of values, e.g., by clicking on respective indications, or simply exit the subcontractor schedule of values web page. In an embodiment of the invention, the subcontractor is notified by email of whatever action the general contractor takes through the Internet 50. For example, the subcontractor may receive an email at the subcontractor web client 104 stating that "your schedule of values has been approved," "your schedule of values has been rejected," or "your schedule of values has been viewed." Further, the subcontractor is able to access the program to check the status of the approval, which information is available from the web server 52 over the Internet 50 at any time. The general contractor is also able to include comments regarding the subcontractor's schedule of values, which likewise may be included in the status email sent to the web client 104.

Figure 21:
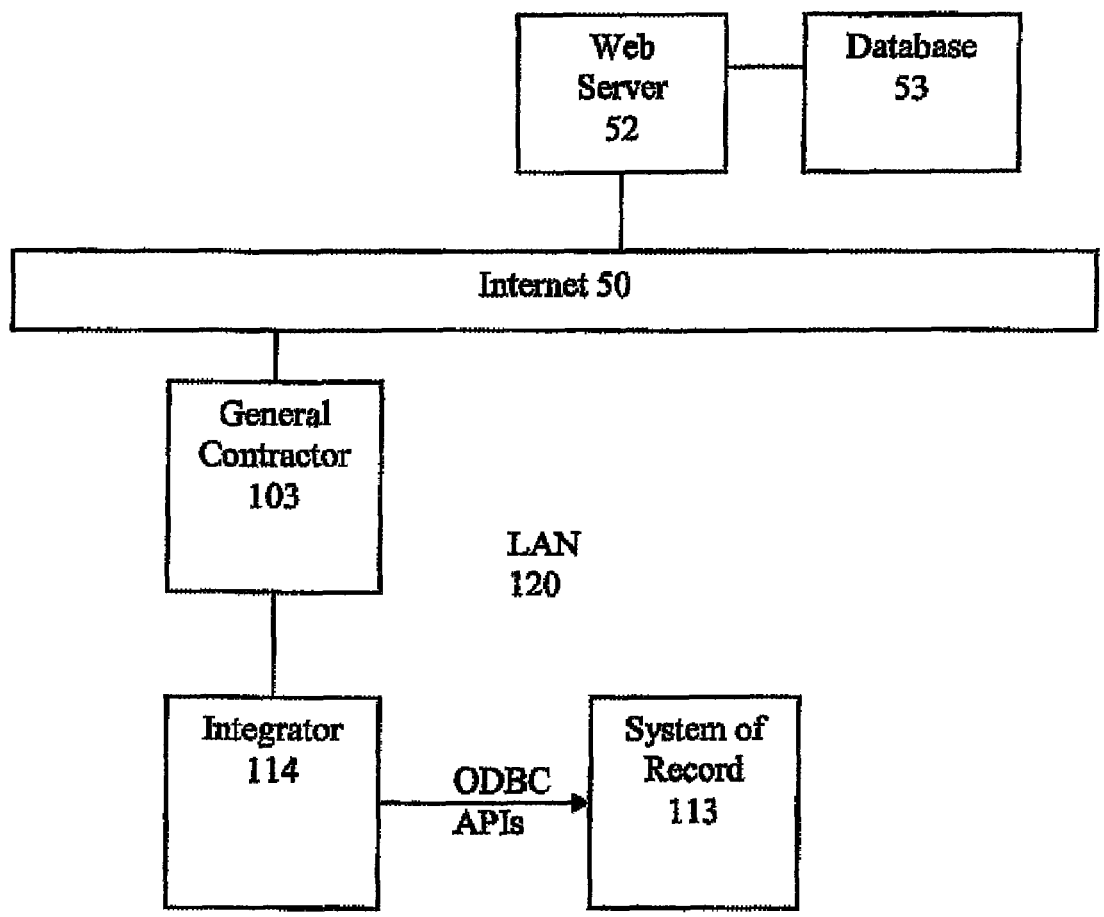
FIG. 21 is a block diagram showing an exemplary integrator for interfacing with a system of record, according to an aspect of the present invention.

In an embodiment, once a subcontractor's schedule of values is approved, an interface may be established between the general contractor's web client 103 and any of the general contractor's relevant systems of record, as discussed below. For example, as shown in FIG. 21, the general contractor may have a system of record, such as accounting system 113, which can be automatically updated based on various entries of the subcontractor's schedule of values via integrator 114, as discussed below.

At step s222 of FIG. 2, the general contractor associates the line items of the subcontractor's schedule of values with the line items of the general contractor's schedule of values. Association with the general contractor's line items is necessary so that the contract administration program is able to automatically determine payment amounts in applications for payment, for example, based on a contract administration algorithm, discussed below. From the general contractor's schedule of values web page, the general contractor views the line items and associated values of the schedule of values submitted to the owner/architect. In an embodiment of the invention, the general contractor then opens an unassociated items window, within the schedule of values web page, which displays all line items from all subcontractor schedules of values that have been submitted for the project that have not yet been associated with general contractor line items.

As shown in FIG. 7, an unassociated items window 710 can be opened, resized and dragged anywhere on the general contractor schedule of values web page 700, enabling the general contractor to directly compare the various subcontractor line items with the general contractor line items without have to open and close the associated web pages. In an embodiment of the invention, a subcontractor line item is associated with a general contractor line item by clicking on the subcontractor line item, holding down on the left mouse button and dragging the item to a folder icon 720, for example, associated with the desired general contractor line item. The association is completed by releasing the mouse button. Alternative embodiments incorporate any method of efficiently associating the two sets of line items without departing from the spirit and scope of the present invention. The associated subcontractor and general contractor line items are stored in the database 53 at step s224, for example, by clicking on a "save" button 730 on the web page 700.

In the depicted exemplary embodiment, a + icon 721 or other positive indicator appears in order to indicate successful association of the subcontractor line item with the general contractor-line item. Clicking on the + icon opens an associated line items window 722 corresponding to the general contractor line item. Each of the associated line items in the open associated line items window 722 has a corresponding folder 724. To remove an association, the general contractor clicks on the folder 724, holds down the left mouse button and drags the folder (and/or line item) back to the window of unassociated line items 710. Releasing the mouse button completes the removal. The process is repeated until all of the line items of the subcontractor schedules of values, which the general contractor wishes to incorporate into its schedule of values, are associated with the general contractor's line items.

Once the schedules of values are created, associated and approved, the subcontractors may submit change order requests to the general contractor, and the general contractor may submit change order requests to the owner/architect, over the Internet 50 to the web server 52. Change order requests seek alterations to the respective submitted and approved schedules of values to reflect a change in performance of work on a contract. Typically, change order requests seek compensation for additional work performed, materials procured or other unanticipated expenses. However, change orders may also request a reduction in compensation based on work or materials that is determined to be unnecessary in the course of the project.

A subcontractor builds a change order by first retrieving a list of current change orders from the web server 52, to be displayed at the subcontractor web client 104 or 105, for example. The new change order may be included in an existing change order that has not yet been approved, or provided as a separate change order. Also, unapproved change orders may be edited or deleted at any time.

To create a change order, the subcontractor enters data identifying the item number of the subcontractor's schedule of values, with which the change order is associated. However, the change order may also identify a new item number to the extent it involves work that is not readily associated with the existing subcontractor line items. The subcontractor also enters a description of the additional work, e.g., "additional building pad work," and the scheduled value of the change order, e.g., $3,000.00. The change orders are numbered incrementally. As in the case of the schedules of values, the contract administration program enables the subcontractor to enter comments about the change order to be submitted along with the change order. The subcontractor clicks on a "submit to owner" button, for example, to send the change order to the web server 52, which stores the change order in the database 53 and generates an email to the general contractor at the web client 103 informing of the submitted change order.

The general contractor, in turn, incorporates the subcontractor change order into a general contractor change order and submits the general contractor change order to the owner/architect in the same manner described above. In an embodiment, the general contractor may incorporate more than one subcontractor change order into a general contractor change order, in which case the general contractor change order includes a list of the associated subcontractor change orders.

The general contractor reviews and approves or rejects the subcontractors' change orders in much the same manner it reviews and approves or rejects the subcontractors' schedules of values. For example, the general contractor associates the line items of a subcontractor's change order with the line items of the general contractor's schedule of values. The general contractor submits the change order, sending it to the web server 52. The web server 52 stores the change order in the database 53 and generates an email to the owner/architect at the web client 102 informing of the submitted change order.

The owner/architect reviews the change order and determines whether to accept or reject it. Data indicating the decision is stored in the database 53 and sent by email to the general contractor at the web client 103. When the general contractor receives notice of approval, the general contractor approves the corresponding subcontractor's change order. Likewise, data indicating the approval is stored in the database 53 and sent by email to the appropriate subcontractor at the web client 104 or 105.

Once the original schedules of values are created, associated and approved, the general contractor and subcontractors are able to begin submitting applications for payment over the Internet 50 to the web server 52. Of course, the original schedule of values is updated throughout the course of project performance based on approved change orders, described above. Typically, the general contractor does not submit an application for payment until it has received a number of applications for payment from the subcontractors. The application for payment format may be an industry standard format or government required format. Accordingly, the subcontractors' applications for payment are addressed first.

Referring to FIG. 8, a subcontractor cannot submit an application for payment until it has received approval of its schedule of values from the general contractor at step s810. As stated above, the subcontractor automatically receives notice that its schedule of values has been approved by email over the Internet 50. Also, the subcontractor may access the contract administration program at the web server 52 from the web client 104 or 105 at any time to check the status of the approval.

Figure 9:
FIG. 9 is an exemplary web page for submitting a subcontractor application for payment, according to an aspect of the present invention.

Once approval is received and work on the project commences, the subcontractor periodically creates applications for payment. The timing of the applications for payment are generally governed by the subcontract and may include, for example, submitting an application weekly, monthly or upon completion of predetermined project milestones. The subcontractor accesses the web server 52 from the web client 104 or 105 and retrieves a web page at step s812 designed to elicit information regarding the status of the work performed on the project, an example of which is web page 900 of FIG. 9.

The initial application for payment is based on the approved schedule of values. Therefore, before entering any amount to be billed under the subcontract, the application for payment must be edited to include any change orders sought by the subcontractor. At step s814, the subcontractor determines whether any change orders have been submitted to the general contractor since work began. When change orders have been submitted, and approved, the subcontractor decides which, if any, change orders to include in the present application for payment at step s816. Any change orders not included may be submitted in subsequent applications for payment. The line items corresponding to the change orders are automatically updated to reflect the subject matter of the change orders at step s818.

After the line items are updated, or when no approved change orders exist, the subcontractor begins building the application for payment. Referring to the web page 900, the subcontractor enters basic information at step s819 to track the application, including, for example, the application number 901, the application date 902 and the time period 903 covered by the application. In an embodiment of the invention, these fields are completed automatically by the contract administration program, along with the identification of the subcontractor submitting the application, the name of the project, the contracting parties and the like.

At step s820, the subcontractor enters the work completed and the material stored. The subcontractor uses the fields provided on the web page 900 to accurately track the progress of the subcontract performance. For example, columns A, B and C are the item number 910, the description of work 911 and the scheduled value 912, which respectively match the line item numbers, descriptions of work and scheduled values assigned by the subcontractor in its schedule of values (and modified by any approved change orders selected by the subcontractor in step s816).

Columns D and E show the work completed 913 by the subcontractor during the period covered by the application for payment. The work completed 913 is divided into work completed—from previous application 915 and from this period 916. Because the exemplary application for payment is the initial application for payment, the work completed from previous application 915 is all zeros. The work completed—this period 916 shows the amount of work performed in dollars. For example, for line item 1001 (CMU foundations—materials), $800 has been expended of the $8,000 allocated for that line item, and for line item 1002 (CMU foundations—labor), $1,000 has been expended of the $10,000 allocated.

When the schedule of values has been provided in unit pricing format, as discussed above, the work completed must be expressed in appropriate units to be submitted. For example, the work completed 913 may be further divided into number of units completed, the cost per unit and the description of the unit (not shown). The contract administration program may then calculate the work completed, from the previous application 915 and from this period 916, by automatically multiplying the number of units and the cost per unit, for submission to the general contractor. As discussed above, the application for payment reflects the corresponding schedule of values, so any schedule of values line items that do not include unit pricing will likewise not include unit pricing in the application for payment.

Column F of the web page 900 shows the materials presently stored 917. This column contains the dollar amount of materials purchased by the subcontractor and stored, e.g., on site, but not yet incorporated into the project. In the present example, none of the line items include an amount for materials stored. The subcontractor indicates when it finishes entering the work completed and the materials stored, for example, by clicking a "re-calculate fields" button on the web page 900 (not pictured).

At step s824, the contract administration program calculates the remaining entries of the web page 900. For example, column G shows the total dollar amount associated with each line item, including the total work completed 913 (i.e., the sum of the work completed—from previous application 915 and the work completed—this period 916) and the materials presently stored 917 for each line item. Column G also includes the percentage 919, showing the percentage of completion based on a comparison of the total completed and stored to data 918 with the scheduled value 912. For line items 1001 and 1002, 10 percent of the scheduled value is included in this application for payment. Column H, balance to finish 920, shows the remaining amount of the scheduled value to be performed by the subcontractor for each line item.

In the row showing grand totals 930, the totals for each line item are automatically determined for each of the columns. One exception is the column for percentage 919, which does not show the total percentages. Rather, the percentage 919 for the grand total 930 shows the percentage of the total work completed 918 to the total scheduled value 912.

In an embodiment, the information relating to the completed work by the subcontractor is provided to the general contractor's system of record, such as accounting system 113, via the integrator 114 of FIG. 21. The integrator 113 enables the accounting system 113 to automatically update the user's internal accounting records to reflect the progress, indicated by applications for payment, as discussed below.

In an embodiment of the invention, the subcontractor indicates whether the general contractor is allowed to make modifications to the application for payment by clicking on the YES/NO radio buttons 931. By agreeing to allow the general contractor to make modifications, the subcontractor may expedite approval of the application for payment, as well as the subsequent general contractor application for payment, in which the subcontractor's application is included. The subcontractor can also enter explanations of charges, give status reports or the like in the comments window 932.

The subcontractor submits the application for payment to the general contractor at step s826, for example, by clicking on the "submit to owner" button 933. The application for payment is stored at the database 53 by the web server 52 for the general contractor to review. As with the schedules of values, the web server 52 also generates and sends an email to the general contractor at the web client 103 to inform the general contractor that a new application for payment has been submitted.

Also, any supporting documentation required by the general contractor may be submitted electronically at this time. The subcontractor may identify and/or include the documentation in support of one or more line items by uploading documents in substantially the same manner as discussed above with respect to FIGS. 15 and 16. Referring to FIG. 15, in particular, the depicted process begins with saving the subcontractor's application for payment to which the document is to be attached, and proceeds in substantially the same manner with respect to obtaining and uploading the documents. Accordingly, explanation of the process will not be repeated.

With respect to the uploaded documents, the general contractor may require, for example, an insurance certificate, an inspection sign-off or other documentation from the subcontractor before payment can be approved or made. The receipt of these documents is tracked, either automatically or in response to prompts by the contract administration program. Accordingly, the general contractor and/or the subcontractor is notified of any such outstanding requirements with respect to the application for payment whenever the subcontractor attempts to submit the current application for payment.

As discussed above, supporting documentation may consist of attachments to an email, attachments to a web page, such as the web page 900, which may be indicated by a pop-up message, links to other web pages or databases, and the like. For example, an insurance certificate or a scanned copy of a lien waiver that has been associated with the project and/or the subcontractor may be attached, e.g., as a PDF file, to an email approving the subcontractor's application for payment. Documents that need to be executed may be digitally signed and sent in a return email, or printed out, signed and returned as a scanned attachment to an email or by regular mail. Digitally signed and returned documents may be automatically updated on the web server 52. Otherwise, an associated indicator is manually updated by the general contractor, e.g., based on reminders or pop-ups provided by the contract administration program. As stated above, the general contractor will not be able to approve an application for payment if previously required documents have not been received. It is understood that any type of electronic delivery and/or execution of documents may be incorporated into the application for payment approval process without departing from the spirit and scope of the present invention.

In an embodiment of the invention, the subcontractor's application for payment cannot be approved unless all of the previous applications for payment have been approved. Also, as stated above with respect to schedules of value, once an application for payment has been approved or rejected, its state cannot be changed, so the general contractor should not approve the subcontractor applications for payment until after it receives approval for the general contractor application for payment in which the subcontractor applications are incorporated. Once an application for payment has been rejected, all subsequent applications for payment from the same subcontractor are also rejected. Similar to the subcontractor schedules of values, the applications for payment submitted to the general contractor have one of four statuses: submitted, viewed, approved and rejected. In an embodiment of the invention, the subcontractor receives an email from the web server 52 whenever the general contractor views, approves and/or rejects each submission.

The general contractor's application for payment to the owner/architect is similar to that of the subcontractor's application for payment to the general contractor. Initially, the general contractor receives an approval of its schedule of values from the owner/architect at step s1010 of FIG. 10. Typically, the general contractor receives the notice at the web client 103 from the web server 52 as an email.

The general contractor determines to submit an application for payment, based on project completion milestones, agreed monthly or weekly submissions, target dates or the like, as indicated in the general contract. The general contractor logs onto the contract administration program at the web server 52 and selects application for payment for the desired project from a project detail web page. At step s1012, the web client 103 retrieves the application for payment form web page from the web server 52 over the Internet 50. An exemplary application for payment web page is depicted as web page 1100 in FIG. 11.

At step s1014, the general contractor determines whether any subcontractor applications for payment have been newly submitted or have not yet been included in a previous general contractor application for payment. If so, the general contractor retrieves a list of subcontractor applications at step s1016 and selects the applications that are to be included in the general contractor's application for payment at step s1018. The general contractor also has self-performed tasks, included in the schedule of values and an application for payment, that do not involve performance of work by a subcontractor.

At step s1020, the general contractor determines whether any change orders have been newly submitted or have not yet been included in a previous application for payment. When there are change orders, the general contractor assures that it has received approval of the change orders from the owner/architect at step s1022, discussed above. The general contractor then selects the change orders, if any, to include in the application for payment at step s1024. Any change orders not included may be submitted in subsequent applications for payment. Also, in an embodiment of the invention, a subcontractor change order cannot be disassociated from a general contractor change order once the subcontractor application for payment that includes the subcontractor change order has been included and submitted in a general contractor application for payment. The line items corresponding to the change orders are automatically updated to reflect the subject matter of the change orders.

After the line items are updated, or when no approved change orders exist, the general contractor begins building the application for payment. Referring to the web page 1100, the subcontractor enters basic information at step s1028 to track the application, including, for example, the application number 1101, the application date 1102 and the time period 1103 covered by the application. In an embodiment of the invention, these fields are completed automatically by the contract administration program, along with the identification of the name of the general contactor, the name of the project, the contracting parties and the like.

At step s1030, the general contractor enters the work completed and the material stored. The general contractor uses the fields provided in the web page 1100 to accurately track the progress of contract performance. For example, columns A, B and C are the item number 1110, the description of work 1111 and the scheduled value 1112, which respectively match the line item numbers, descriptions of work and scheduled values assigned by the general contractor in its schedule of values (and modified by any approved change orders selected by the general contractor in step s1024).

When the schedule of values has been provided in unit pricing format, as discussed above, the work completed must be expressed in appropriate units to be submitted. For example, the work completed 1113 may be further divided into number of units completed, the cost per unit and the description of the unit (not shown). The contract administration program may then calculate the work completed, from the previous application 1115 and from this period 1116, by automatically multiplying the number of units and the cost per unit, for submission to the owner/architect. As discussed above, the application for payment reflects the corresponding schedule of values, so any schedule of values line items that do not include unit pricing will likewise not include unit pricing in the application for payment.

Columns D and E shown the work completed 1113 on the project during the period covered by the application for payment. The work completed 1113 is divided into work completed—from previous application 1115 and from this period 1116. Assuming the exemplary application for payment is the initial application for payment, the work completed from previous application 1115 is all zeros. The work completed—this period 1116 shows the amount of work performed in dollars. For example, for line item 103*a* (clear building pad), $5,500 has been expended of the $11,000 allocated for that line item, and for line item 103*b* (clear remaining site), $6,000 has been expended of the $6,000 allocated. Column F of the web page 1100 shows the materials presently stored 1117. This column contains the dollar amount of materials purchased by the subcontractor and stored, but not yet incorporated into the project. In the present example, none of the line items include an amount for materials stored.

The work completed and the materials stored for each line item, as well as the general contractor's markup, are entered at step s1030 of FIG. 10. Also, at step s1034, the amount previously billed is entered, for example, in column D, from previous application 1115. Unlike the subcontractor applications of payment, the general application for payment includes the general contactor's markup. For example, the $11,000 allocated for line item 103*a* includes an exemplary ten percent markup on the subcontractor's work. In other words, the subcontractor had scheduled $10,000 for this work and the general contractor added a $1,000 markup (ten percent) in its corresponding scheduled value. Likewise, the work completed 1113 for this period 1116 is based on a $5,000 submission from the subcontractor and a $500 markup by the general contractor.

In an embodiment of the invention, the work completed this period 1116 and the materials presently stored 1117 fields are automatically populated by the contract administration program at steps s1030 and s1034 when the general contractor clicks on a button labeled "auto-populate" (not pictured), for example. The program then populates these fields based on information stored in the database 53, such as the general contractor schedule of values, the subcontractor applications for payment, the associated line items, the approved change orders and the like.

The amounts automatically entered, however, are guide values for the general contractor, who may replace any of the automatically populated fields with any figure it desires within the scheduled value amount. For example, the general contractor may want to front-load payments under the contract by billing the owner/architect more than amounts billed by the subcontractor. Whether the general contractor has the right to front-load is typically covered by the terms and conditions of the general contract.

In an embodiment of the invention, the fields are recalculated for each GC line item according to the following algorithm:

$$WC_{(LI)} = \frac{E_{(SC)}}{C_{(SC)} - D_{(SC)}} \times C_{(GC)} - D_{(GC)} \qquad (1)$$

Where: $WC_{(LI)}$=the general contractor line item (from the schedule of values) for which the work completed payment amount is being determined; $E_{(SC)}$=the work completed in the current period for all subcontractor line items associated with the general contractor line item; $C_{(SC)}$=the original scheduled value for all subcontractor line items associated with the general contractor line item; $D_{(SC)}$=the work completed as of the previous application for all subcontractor line items associated with the general contractor line item; $C_{(GC)}$=the original scheduled value of the general contractor's line item; and $D_{(GC)}$=the work completed as of the previous application for the general contractor's line item.

The work completed calculation divides the work completed for the present period for all associated subcontractor line items by the work remaining for the same subcontractor line items to determine a ratio, $E_{(SC)}/(C_{(SC)}-D_{(SC)})$. The ratio is multiplied by the remaining work of the general contractor, $C_{(GC)}-D_{(GC)}$, to determine the amount that the general contractor should use for work completed this period 1113. Using the remaining work instead of just the original work accommodates the situation in which the general contractor "front loads" its applications for payment, i.e., initially billing the owner at a higher rate than it is actually paying the subcontractor.

Referring to the example depicted in web page 1100 of FIG. 11, the contract administration program determines the amount of work completed this period 1113 for Item number 101, based on the subcontractor application for payment as follows: $E_{(SC)}$=$10,000; $C_{(SC)}$=$20,000; $D_{(SC)}$=0; $C_{(GC)}$=$22,000; and $D_{(GC)}$=0. Note that the subcontractor figures are based on the general contractor figures, less the general contractor's 10 percent markup. Also, since the application for payment of FIG. 11 is an initial application for payment, the work completed as of the previous application for both the subcontractor and the general contractor is "0." Accordingly, the application for payment amount is determined as follows:

$$AFP_{(101)}=10,000/20,000\times 22,000=\$11,000$$

The contact administration program can also determine the amount of materials stored 1117 included by the general contractor in its application for payment to the owner/architect for each line item. In an embodiment of the invention, the field is calculated for each GC line item according to the following algorithm:

$$MPS_{(LI)} = \frac{F_{(SC)}}{C_{(SC)}} \times C_{(GC)} \quad (2)$$

Where: $MPS_{(LI)}$=the general contractor line item for which the materials presently stored payment amount is being determined; $F_{(SC)}$=the stored materials for the current period for all subcontractor line items associated with the general contractor line item; $C_{(SC)}$=the original scheduled value for all subcontractor line items associated with the general contractor line item; and $C_{(GC)}$=the original scheduled value of the general contractor's line item.

The stored materials calculation divides the materials presently stored for the present period for all associated subcontractors line items by the original scheduled values for the same line items. This ratio is then multiplied by the corresponding original scheduled value of the general contractor to determine the amount that the general contractor should claim for the materials presently stored. There is no "remaining" stored materials, as in the work completed, so factoring a remaining amount is not applicable to determining the materials presently stored.

As stated above, following the guide value for each line item in the general contractor application for payment is discretionary. The general contractor may accept the automatically determined amount, or enter a higher or lower amount. For example, the general contractor may wish to "front load" its applications for payment, initially billing the owner at a higher rate than it is actually paying the subcontractor. Regardless, the contract administration program will apply the algorithms expressed in equations (1) and (2), above, with respect to subsequent applications for payment, resulting in guide values that fully amortize the payment applications to the owner/architect when the subcontractor(s) has been fully paid, even when the general contractor ignores the previous guide values, e.g., when it front-load certain line items.

FIGS. 12A-12C shown portions of exemplary spread sheets in which the general contractor elects to front load its applications for payment, requesting a higher payment in the initial application for payment than has been submitted for the corresponding line item by the subcontractor. FIG. 12A shows three line items from a sample first subcontractor application for payment 1210, indicating in columns E and F, respectively, that the total work completed on the subcontract is $7,500 and the total materials presently stored is $2,500. The sample first general contractor application 1230 shows the guide values in columns E and F calculated by the contract administration program in accordance with equations (1) and (2), respectively. Assuming a 10 percent markup, the guide values are determined to be $8,250 and $2,750 for the work completed this period and the materials presently stored.

FIG. 12B shows the same three line items from a sample second subcontractor application for payment 1240, indicating in columns E and F, respectively, that the additional work completed on the subcontract is $11,000 and the total materials presently stored is still $2,500. The sample second general contractor application 1260 again shows the guide value in columns E calculated by the contract administration program in accordance with equation (1). (Note that the materials presently stored in column F is unchanged.) However, as indicated in column D of the second general contractor application 1260, the general contractor front loaded its previous application by submitting $12,000, as opposed to the guide value of $8,250, as the work completed from the previous application. Therefore, the guide value determined according to equation (1) in column E is $10,266.67. As a result, the total completed and stored to date entry is $25,016.67, while if the guide value had been followed in the first general contractor application 1230, the total completed and stored to date entry would have been $23,100.

FIG. 12C shows the same three line items from a sample third subcontractor application for payment 1270, indicating in columns E and F, respectively, that the additional work completed on the subcontract is $11,500, with no materials presently stored, resulting in 100 percent completion of the work scheduled for those three line items, indicated by the percentage in column G. The sample third general contractor application 1290 again shows the guide values in column E calculated by the contract administration program in accordance with equation (1). As indicated in column D, the general contractor followed the guide value from the previous application and submitted the total work from previous applications as $22,266.67. Therefore, the guide value determined according to equation (1) in column E is $10,733.33, which coincides with the remaining amount of work to be performed for the general contractor's line item. Note that the materials presently stored in column F is zero, indicating that the stored material has been used. Accordingly, FIGS. 12A-12C demonstrate that the contract administration program accurately tracks, and recommends appropriate application for payment values, even in the case where the general contractor front loads its billing.

Referring back to FIG. 10, the general contractor indicates that it has finished entering the work completed and the materials stored values by clicking a "re-calculate fields" button (not pictured), for example. At step s1036, the contract administration program calculates the remaining entries of the web page 1100 based on the entered values. For example, column G shows the dollar total amount associated with each line item. Column G includes the total completed and stored to data 118, which includes the sum of the work completed— from previous application 1115, the work completed—this period 1116, and the materials presently stored 1117 for each line item. Column G also includes the percentage 1119, showing the percentage of completion based on a comparison of the total completed and stored to data 1118 with the scheduled value 1112. For line item 103*a* and 103*b,* 50 percent and 100 percent of the scheduled values are respectively included in this application for payment. Column H, balance to finish 1120, shows the remaining amount of the scheduled value to be performed on each project line item.

In the row showing grand totals 1130, the totals for each of the general contractor's line items are automatically determined for each of the columns. One exception is the column for percentage 1119, which does not show the total percentages. Rather, the percentage 1119 for the grand total 1130 shows the percentage of the total work completed 1118 to the total scheduled value 1112. The GC can also enter explanations of charges, give status reports or the like in the Comments window 1132.

In addition, the retainage may be calculated by the contract administration program. When the variable retainage is used, the GC enters an indication of variable retainage, for example, by checking a variable retainage box (not shown), which provides flexibility to the GC. As discussed above, work completed may be entered as a percentage, in which case the corresponding dollar amount complete is calculated, or as a dollar amount, in which case the percentage complete is calculated. The amounts for materials stored are likewise entered. The last column (e.g., column I in FIGS. 12A-12C), the retainage may be entered on a line item-by-line item basis when using variable retainage. The amount of retainage to be held on each line is entered. If no retainage is to be held, the box is left blank. The amount of retainage may be entered as a percentage or as a dollar amount. The final bill for variable retainage will be the cumulative amount of retainage withheld from each billing. In comparison, using normal retainage, the final billing for retainage is the total amount retained on the previous bill. By adding retainage from all bills, the sum will total the amount billed when the final billing for retainage is created.

The general contractor submits the application for payment to the general contractor at step s1040, for example, by clicking on the "submit to owner" button 1133. The application for payment is stored at the database 53 by the web server 52 for the owner and/or architect to review. As with the schedules of values, the web server 52 also generates and sends an email to the owner/architect at the web client 102 to inform them that a new application for payment has been submitted.

Also, any supporting documentation required by the owner/architect may be submitted electronically at this time. The general contractor may identify and/or include the documentation in support of one or more line items by uploading documents in substantially the same manner as discussed above with respect to FIGS. 15 and 16. Referring to FIG. 15, in particular, the depicted process begins with saving the general contractor's application for payment to which the document is to be attached, and proceeds in substantially the same manner with respect to obtaining and uploading the documents. Accordingly, explanation of the process will not be repeated.

As described above with respect to subcontractor applications for payment, in an embodiment of the invention, the general contractor's application for payment cannot be approved unless all of the previous applications for payment have been approved. Also as stated above, once an application for payment has been approved or rejected, its state cannot be changed. Once an application for payment has been rejected, all subsequent applications for payment from the same subcontractor are also rejected. Similar to the subcontractor applications for payment, the general contractor's applications for payment have one of four statuses: submitted, viewed, approved and rejected.

The owner/architect reviews the general contractor's application for payment, as described above with respect to approval of subcontractor applications for payment. For example, the owner/architect is notified of the pending application for payment by email and logs onto the contract administration program at the web server 52 to retrieve the application. The owner/architect can approve or reject the application for payment, an indication of which is stored in the database 53 for retrieval by the general contractor, as well as emailed to the general contractor at the web client 103. The owner/architect may include comments in the approval or rejection email, such as "check will be mailed on Friday."

Also as described above with respect to subcontractor applications for payment, any supporting documentation required by the owner/architect may be submitted electronically at this time by the general contractor. For example, the owner/architect may require lien waivers or inspection sign-offs from the general contractor and/or subcontractor(s), either before or after an application is approved or payment is made, depending on the project requirements. As discussed above, the supporting documentation may consist of attachments to a web page, such as the web page 1100, which may be indicated by a pop-up message, links to other web pages or databases, and the like. The lien waivers or other documents executed by the subcontractors and stored by the general contractors, for example, maybe retrieved from the database 53 by the owner/architect, as needed.

Also, information relating to the submitted request for payment by the general contractor may be provided to the general contractor's system of record, such as accounting system 113 via the integrator 114 of FIG. 21. The accounting system 113 automatically updates the general contractor's internal records to reflect the request.

In an embodiment, the owner/architect is able to initiate an electronic funds transfer at the web server 52, based on bank account data for the owner/architect and the general contractor stored in the database 53. Likewise, the general contractor may have the ability to pay subcontractors over the Internet 50 using electronic funds transfer.

The process of receiving and accepting applications for payment from subcontractors, and sending applications for payment to the owner/architect, is repeated until work on the contract is complete. Other standard contract provisions, such as time-tables, receipt of permits, project inspections, acceptance of the work, release of retainage amounts and the like, are administered in a conventional manner. However, notices of inspection times and dates, release of retainage amounts, as well as other contract governed events, may be noticed over the Internet 50, e.g., by email, and posted at the associated project web site, since the project participants routinely interact with the centralized web server 52.

Accordingly, the present invention provides administration of a contract, and associated subcontracts, from a centralized web server accessible by all contracting (and subcontracting) parties over a packet switched data network, such as the Internet. Schedules of values, applications for payment and change orders corresponding to the general contractor and the subcontractors are built and submitted to the owner/architect and the general contractor, respectively, by way of the web server. Responsive approvals and rejections are likewise communicated through the web servers. Furthermore, emails are generated automatically to notify the contracting and subcontracting parties of the status of various submissions, as well as other contract and project related communications.

An embodiment of the invention further includes a forecasting tool, which may be used to view differences in actual costs and/or progress incurred to date versus the corresponding costs and progress estimated at the beginning of the project. As with the previously described embodiments, the forecasting tool will be described from the perspective of the general contractor for the sake of convenience. However, it is understood that other project participants, such as the subcontractors and the owner/architect, may likewise build and/or retrieve forecast data in order to track the progress of the project. For example, architects may use the forecasting tool to perform construction management services. The forecasting tool provides a graph, for example, which enables relatively quick determination of whether the project is running over anticipated costs or longer than anticipated time.

Figure 19:
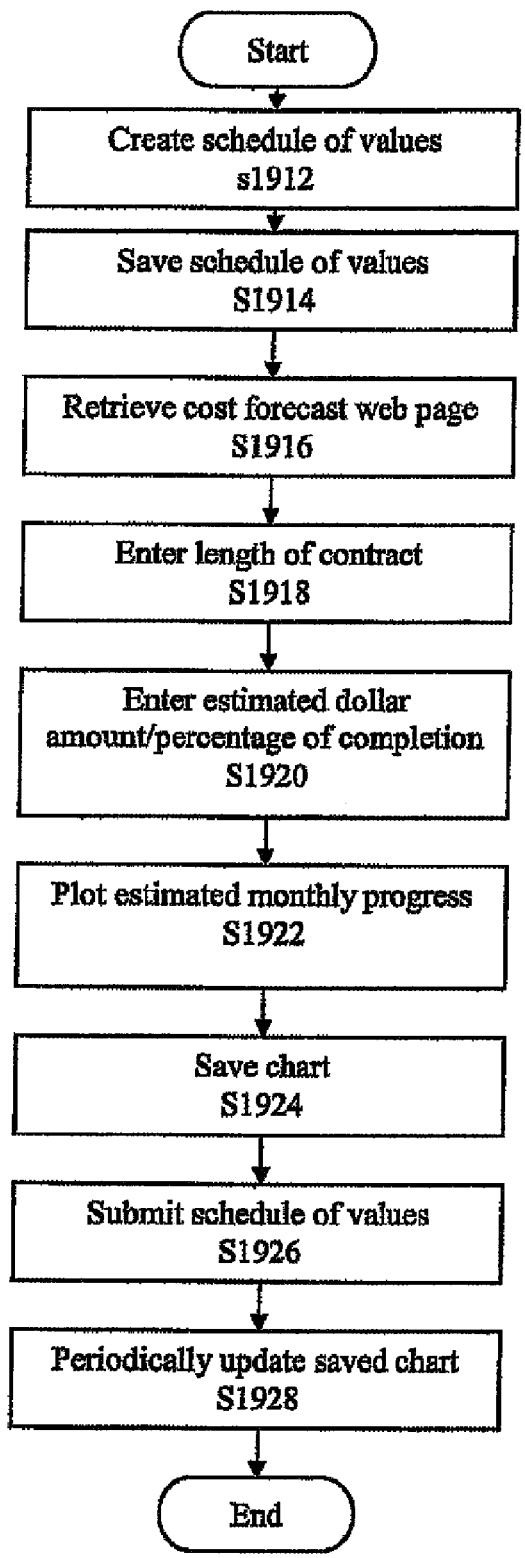
FIG. 19 is a flowchart depicting an exemplary process by which cost forecasting is provided, according to an aspect of the present invention.

FIG. 19 is a flowchart showing an implementation of the forecast tool, according to an illustrative embodiment of the invention. At step s1912, the general contractor creates a schedule of values from the web client 103, in essentially the same manner as discussed above, e.g., with respect to FIG. 4. In an embodiment, the forecasting must be established before the schedule of values is submitted for approval. If the schedule of values has already been submitted, then it must be modified and resubmitted (after implementation of the forecast tool).

Figure 20:
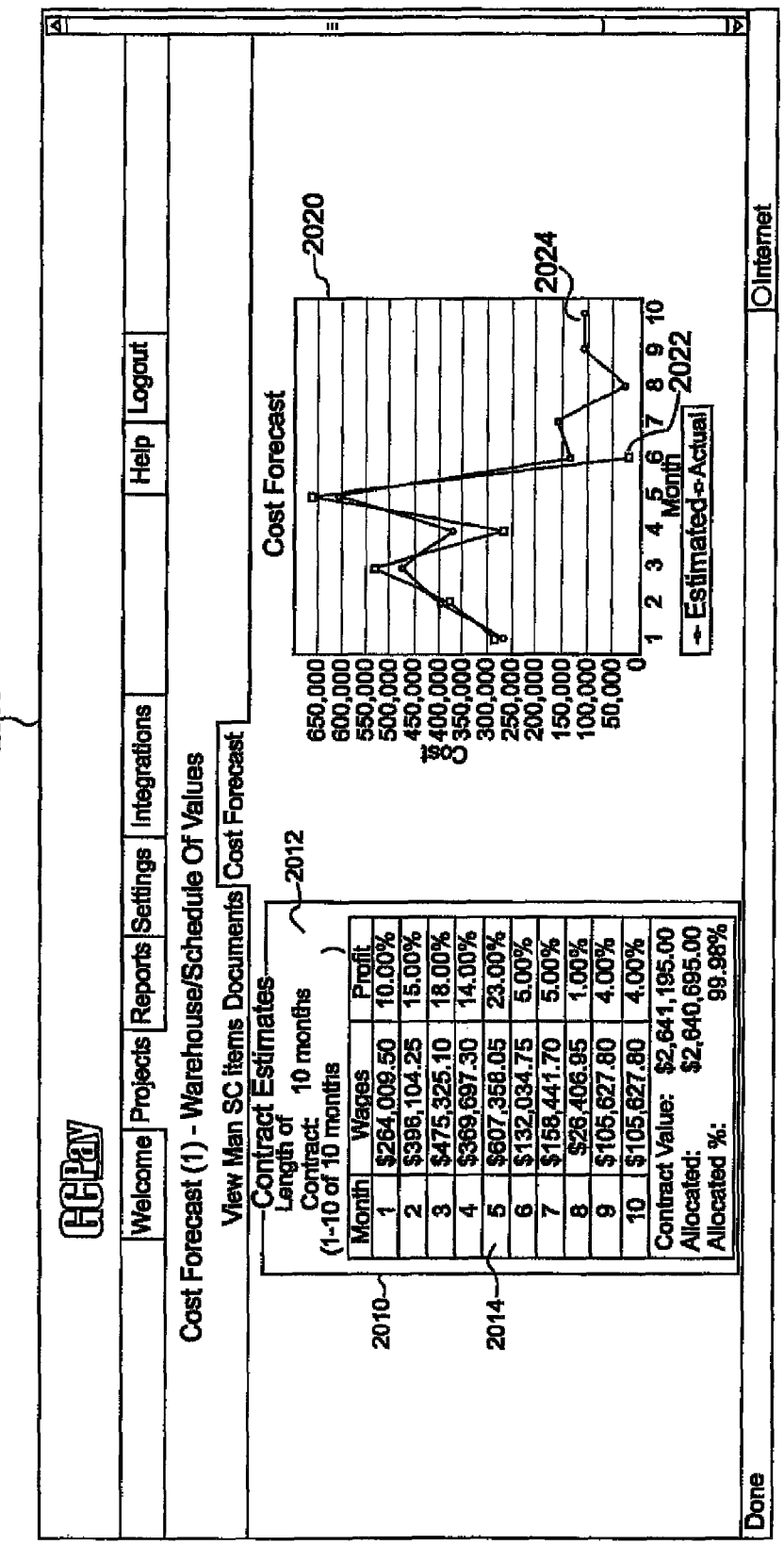
FIG. 20 is an exemplary web page for cost forecasting, according to an aspect of the present invention.

Once the schedule of values is created, it is saved as step s1914. The schedule of values is saved, for example, in the database 53 in association with the general contractor and/or the project. The general contractor may then select a Cost Forecast tab of a web page (not shown), such as the schedule of values web page or the initial web page, at step s1916. In response, the web server 52 causes a cost forecast web page, such as web page 2000 of FIG. 20, to be displayed on the web client 103. The contract estimates are entered in various fields of a contract estimate box 2010. For example, at step s1918, the length of the contract is entered in field 2012, which is 10 months in the depicted example. The web page 2000 may automatically provide a monthly estimate box 2014 in response to the entry in field 2012. In this case, the monthly estimate box 2014 includes 10 rows corresponding to the anticipated 10 month schedule.

At step s1920, the estimated (or target) dollar amount and/or percentage of completion are entered in each row of the monthly estimate box 2014. The total contract value may also be entered by the general contractor (or obtained from the schedule of values), so that as estimated dollar amounts are entered, the contract administration program will automatically indicate an allocated contract value, which is the total contract value less the amounts allocated, and an allocated percentage. At step s1922, the contract administration program plots the estimated monthly progress on a per month bases, shown as graph line 2024 on cost forecast chart 2020. In an embodiment, the estimated monthly progress is plotted substantially simultaneously with the entry of the monthly values in the monthly estimate box 2014.

At step s1924, chart is saved, for example, in the database 53, in association with the contractor and/or the project. The previously saved schedule of values may then be submitted for approval at step s1926. The chart is then updated periodically, indicated by step s1928, in response to applications for payment. For example, the dollar amounts may be plotted as graph line 2022 on the cost forecast chart 2020, based on values and dates automatically extracted from approved applications for payment. In the depicted embodiment, the horizontal axis is months and the vertical axis is whole dollar amount, although it is understood that different measures of progress may be provided as a forecast chart, without departing from the spirit and scope of the invention.

The cost forecast chart 2020 is saved after each update, and may be accessible to all project participants. For example, the general contractor may navigate to the schedule of values web page from the web client 103, and click on a View tab (not shown), which may reveal the projects with which the general contractor is involved. The general contractor may then select the desired project and click on a Cost Forecast tab (not shown) to view the cost forecast chart 2020.

FIG. 21 is a block diagram showing an exemplary network of a web client interfacing with a customer's system of record, according to an aspect of the present invention. The network includes the general contractor web client 103, including the associated computers systems, connected to a system of record (113), through an interface or integrator 114 via local area network (LAN) 120. The system of record may be an accounting system 113, for example, which runs an accounting computer program which can be automatically updated based on various entries of the schedules of values and applications for payment. As stated above, although the illustrative embodiment is described from the perspective of the general contractor, it is understood that the description may also apply to other contract or project participants having corresponding systems of record, such as the subcontractors and owner/architect.

The integrator 114 includes software or middleware, which may be stored on and executed by the web client 103 or which may be implemented by a separate computing system, to interface between the contract administration program software (e.g., GCPay software) and the accounting system 113 software. For example, the accounting system 113 may be a Timberline® Office accounting system provided by Sage Software, Inc., and the integrator 114 may be a Microsoft Windows based application, for example, that enables data from the schedules of values and/or applications for payment to be automatically entered into (or retrieved from) various fields of the Timberline accounting system. For example, accounts payable (A/P) and accounts receivable (A/R) may be created by the accounting system and actual job costs may be reconciled by the accounting system 113 based on the applicants for payment. In an illustrative embodiment, the integrator 114 may be implemented as a GCPay Timberline Integrator™, as described in "GCPay Timberline Integrator™" (July 2007), the contents of which are incorporated herein by reference in their entirety.

In an illustrative embodiment, the web client 103 runs Microsoft Windows and Microsoft NET. The Timberline Office accounting system must include the following modules: contracts, A/P, A/R, Job Cost and Timberline ODBC. There must also be an open database connectivity (ODBC) data source pointing to the Timberline Office data folder, and an application programming interface (API) provided by Timberline Office to interface between the integrator 114 and the accounting system 113.

Generally, the integrator 114 enables the general contractor to import an application for payment from the web server 52 into the accounting system 113 to generate A/P and A/R invoices with little user interaction. Also, the integrator 114 enables the general contractor to match up actual job costs from the accounting system 113 with the applications for payment received from subcontractors and submitted to the owner/architect. Thus, the general contractor may more easily manage cash flow, and assure that billings keep pace with costs. For example, the general contractor may upload job cost information from the accounting system 113 and display the information to assist with preparation of a general contractor application for payment.

In an embodiment, a project is set up with respect to the contract administration program and the accounting system 113. Setting up the project involves establishing a relationship between the contract administration program projects and corresponding accounting system job, establishing a relationship between the contract administration program cost structures (e.g., schedules of values and change orders) and the accounting system cost structures (e.g., contracts/commitments and change orders), and maintaining those relationships as changes occur. Once the relationships have been established, applications for payment may be downloaded, e.g., from the web server 52 via the Internet 50, and imported into the accounting system 113, e.g., via the integrator 114 and the LAN 120. Data from applications for payment submitted by (or created on behalf of) subcontractors to the general contractor may be used to populate A/P invoices, while data from applications for payment submitted by the general contractor to the owner/architect may be used to populate A/R invoices. In an embodiment, invoice information is downloaded and imported after they have been approved within the contract administration program, although unapproved invoices may be downloaded as well. Uploading job costs to the web server 52 from the accounting system 113 enables the general contractor to prepare its own applications for payment, based on actual costs incurred, as recorded by the accounting system 113.

Figure 22:
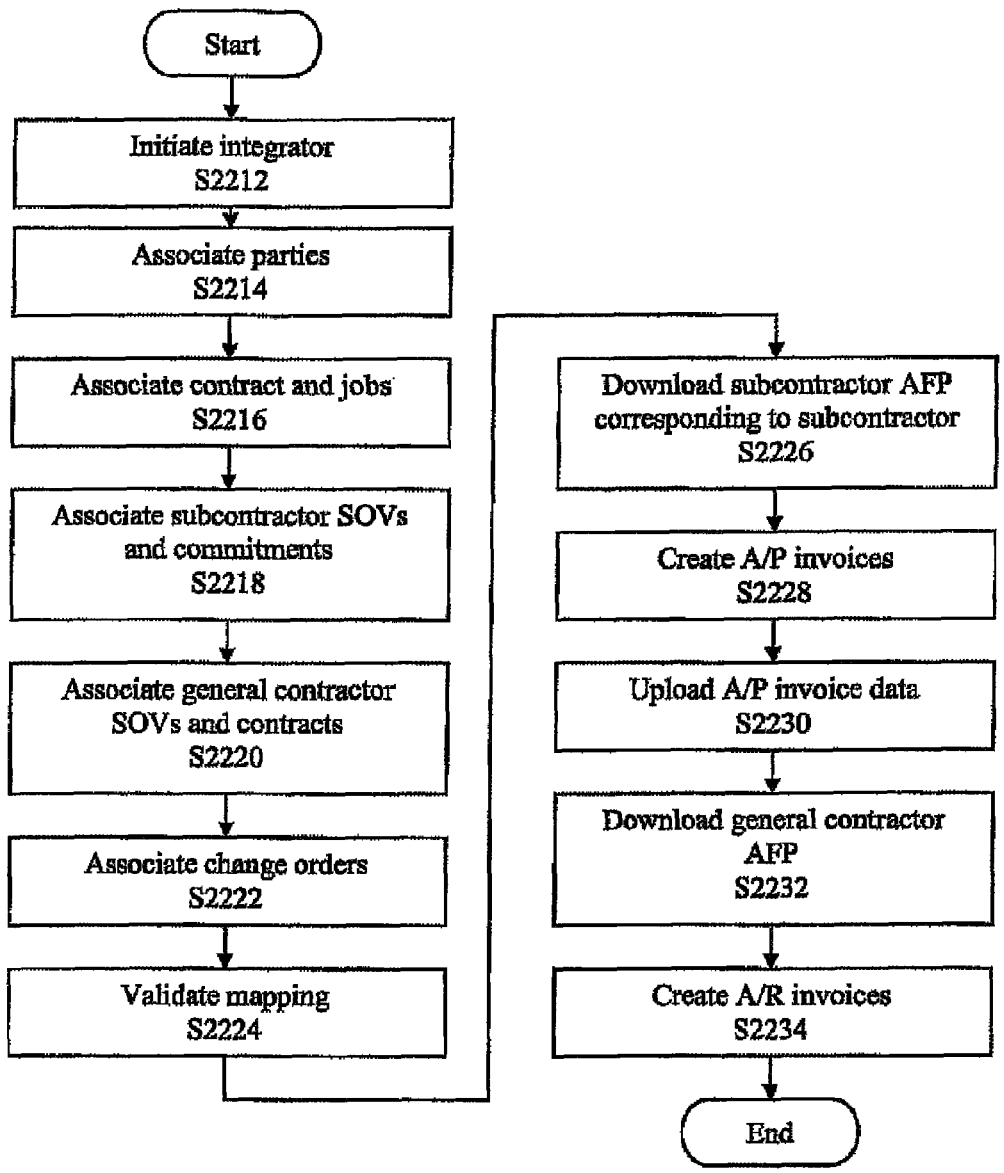
FIG. 22 is a flowchart depicting an exemplary process by which accounting data and contract administration data are integrated, according to an aspect of the present invention.

FIG. 22 is a flowchart depicting an exemplary process by which the contract administration program (e.g., GCPay®) is integrated with a system of record, such as an accounting system (e.g., Timberline® Office). At step s2212, the interface is initiated, for example, by installing integrator software is installed on the integrator 114. In an embodiment, the setup program for the integrator 114 may be downloaded from the web server 52 via the Internet 50. The integrator software may be loaded directly, however, such as through a compact disk, a flash memory, or the like. Once the setup software is stored on the computer (e.g., web client 103), it may be run to install the integrator 114 computer program, configuring the integrator 114. The user (e.g., administrator) may be required provide appropriate login and passwords for both the contract administration program and the accounting system 113. The integrator 114 validates the credentials using the login information from the web server 52 and the accounting system 113, respectively.

At step s2214, the relationships between the "subcontractors" identified with respect to the contract administration program and the "vendors" identified with respect to the accounting system 113 are mapped to one another. Likewise, the relationships between the "owner" and/or "architect" identified with respect to the contract administration program and the "customer" identified with respect to the accounting system 113 are mapped to one another. In an embodiment, the vendors created and saved in the accounting system 113 may be uploaded to the web sever 52, and matched with subcontractors created and saved in the contract administration program. Likewise, the customer created and saved in the accounting system 113 are uploaded to the web sever 52, and matched with the owner/architect created and saved in the contract administration program. The matching may be performed at the contract administration program web site, either manually or automatically, for example, using key terms to identify like entities. All parties may be uploaded at one time, e.g., in a batch, or predetermined sets of vendors of various types may be uploaded incrementally. For example, the accounting system 113 may include "subcontractor" as one type of vendor. Alternatively, the parties may be uploaded on a project-by-project basis (after the projects have been created and associated, as discussed below). This may be done automatically by the integrator 114 using corresponding job records. Also, when matching is done on a project-by-project basis, the parties in the contractor administration program may be searched at the web server 52 in association with a particular project.

A generally new project includes creating a contract administration program project and an accounting system job. Once the project is created, the structures representing the contractual arrangements are created. In the contract administration program, the structures are schedules of values and change orders (as discussed above) and in the accounting system 113, the structures are contracts, commitments and change orders, for example. The structures are related to one another and stored at the web server 52 and/or the database 53. In an embodiment, the schedules of values created by (or on behalf of) the subcontractors for submission to the general contractor correspond to the commitments of the accounting system 113, and the schedules of values created by the general contractor for submission to the owner/architect correspond to the contracts of the accounting system 113.

In an embodiment, the relationships between the structures may be established by creating the accounting system 113 structures first, and then creating the corresponding schedules of values for the contract administration program, which may be done automatically, e.g., at the web server 52. Alternatively, the accounting system 113 structures and the schedules of values may be created separately, and subsequently mapped to one another at the web server 52 or the integrator 114. Once the relationships are established, the corresponding dollar amounts may be compared to validate the accuracy of the mapping.

At step s2216, the contract administration program project is associated with one or more accounting system contracts and/or jobs. The integrator 114 enables the contract and job information, along with the associated parties, to be uploaded from the accounting system 113 to the web server 52 via the Internet 50. In an embodiment, contract and commitment change orders, derived from information in a job cost transaction table of the accounting system 113, may also be uploaded to the web server 52. An "update" button, for example, on a screen shot provided by the integrator 114 may be selected at any time during project performance to upload updated contract, commitment and/or change order information to the web server 52.

Once the various relationships between the contract administration program project and the accounting system job(s) are established, the integrator 114 associates the subcontractor schedules of value with corresponding commitments of the accounting system 113 at step s2218. For example, line items of the schedules of values are associated with entry items of the commitments. The integrator 114 may assist in establishing the schedule of values by uploading the accounting system commitments to the web server 52. For example, to create a subcontractor schedule of values, the subcontractor is first added to the contract administration program project, as discussed above, and mapped to a corresponding accounting system vendor.

In an embodiment, a schedule of values web page provided by the web server 52 provides three possible way to create a schedule of values corresponding to a subcontractor manually entering line items via web client 103, loading a template containing previously saved items, and loading commitments uploaded for the subcontractor (vendor). When the loading commitments option is selected, and one or more uploaded commitments may then be selected for loading. The schedule of values form is then populated with entry items of the uploaded commitment items. The newly created schedule of values is saved, at the web sever 52 and/or database 53, and the line items are automatically mapped to the commitment entry items on which they are based.

When a subcontractor schedule of values is manually created at the web server 52, it can be subsequently mapped to the accounting system commitments. Mapping previously created line items is useful, for example, when if the schedule of values has greater detail than the commitments, or when the subcontractors create the schedules of values themselves, and submit them to the general contractor for approval. To map an existing subcontractor schedule of values to an accounting system commitment, the subcontractor must first be mapped to the corresponding vender in the accounting system 113, as discussed above. A web page provided by the web server 52 lists the previously built schedules of values. The desired schedule of values is selected and a "map commitments" button, for example, is clicked to display a list of line items corresponding to the selected schedule of values. Each line item includes an adjacent drop down list containing the uploaded commitment entry items for the mapped vendor. Multiple line items may correspond to one commitment entry item, since the schedule of values typically provides more detail. After an appropriate commitment entry item is identified for each line item of the selected schedule of values, the mapping is completed by clicking a "select" button, for example.

At step s2220, the general contractor schedule of values for the project, which provided to the owner/architect by the general contractor, is associated with corresponding contracts of the accounting system 113. The integrator 114 may be used to assist in the creation of the general contractor schedule of values by enabling contract information to be uploaded from the accounting system 113 to the web server 52. The web server 52 provides three possible way to create the general contractor schedule of values: manually entering line items via web client 103, loading a template containing previously saved items, and loading a contract uploaded from the accounting system 113. In an embodiment, selecting the contract loading option automatically populates the schedule of value line items with entry items from the uploaded contract. The schedule of values is saved, e.g., at the web server 52 and/or the database 53, and the line items are automatically mapped to the contract entry items on which they were based.

The general contractor schedule of values may likewise be manually associated with the accounting system contract. For example, the schedule of values line items may be created manually, as discussed above with respect to FIG. 4. Subsequently, the schedule of values be viewed and a "map contract" button, for example, is clicked to display a list of the corresponding line items. Each line item includes an adjacent drop down list containing the uploaded contract entry items for the corresponding accounting system contract. Multiple line items may correspond to one contract entry item, since the schedule of values typically provides more detail. After an appropriate contract entry item is identified for each line item of the schedule of values, the mapping is completed by clicking a "select" button, for example.

In an embodiment, the integrator 114 assists in managing change orders of a project. For example, both contract and commitment change orders of the corresponding accounting system job are uploaded to the web server 52 at step s2222 to be associated with the appropriate schedule of values. The uploaded accounting system change orders are converted to contract administration program change orders that modify appropriate schedules of value. For example, by selecting an "update" button on a web page provided by the integrator 114, corresponding to the job, all approved change order information that has occurred since the last update is uploaded to the web server 52. The updating may be performed every time a new change order is approved, or on a periodic basis, such as weekly or monthly.

To convert the uploaded change orders to contract administration program change orders, the web server 52 is accessed and change orders under the selected project are viewed. If there are subcontractors that have accounting system commitment change orders that have not yet been converted to contract administration program change orders, there are two options. First, contract administration program change orders may be created and approved for all uploaded commitment change orders. Second, contract administration program change orders may be created and approved only for a particular vendor. In an embodiment, change orders initially implemented in the contract administration program may likewise be downloaded to the accounting system 113.

In an embodiment, the integrator 114 enables the general contractor to validate that all of the elements of the contract administration project have been mapped to their equivalents in the accounting system 113 at step s2224. Also, the general contractor will be alerted if dollar amounts between associated items differ. For example, a pop-up window may be provided by the integrator 114 as an alert if a subcontractor schedule of values differs in amount from the total accounting system commitment items which have been associated with the schedule of values line items.

Generally, once a project has been set up in the contract administration program and a corresponding job has been set up accounting system 113, and the various line items and entry items have been mapped, A/P invoices may be downloaded from the web server 52, reviewed and imported directly into the accounting system 113, in real time. Also, A/R invoices may be downloaded from the web server 52 and an import text file may be generated for importing to the accounting system 113, as discussed below.

Referring again to FIG. 22, the integrator 114 enables the general contractor to create accounting system A/P invoices from subcontractor applications for payment received through the web server 52. At steps s2226, subcontractor applications for payment are downloaded from the web server 52 to the integrator 114. A screen shot from the integrator 114 may provide a list of subcontractor applications for payment which has been downloaded from the web server 52. After review, the applications for payment are imported directly to the accounting system 113 via the integrator 114, for example, by clicking an "import all" button on the integrator screen shot. In an embodiment, the accounting system 113 receives the information in real time through the API and creates corresponding A/P invoices for the associated vendors at step s2228.

The integrator 114 also enables the general contractor to create accounting system A/R invoices from general contractor applications for payment. In an embodiment, the general contractor application for payment may be created using the A/P invoices, uploaded via the integrator 114 at step s2230. Alternatively, the application for payment may be created using only the contract administration program, as discussed above, for example, with respect to FIG. 10.

Once the general contractor application for payment is created, it is downloaded from the web server 52 to the integrator 114 via the Internet 50 at step s2232. A screen shot from the integrator 114 may provide a list of receivable applications for payment which has been downloaded from the web server 52. After review, the application for payment is sent to the accounting system 113 via the integrator 114, for example, by clicking an "import all" button on the integrator screen shot. The accounting system 113 receives the information and creates corresponding A/R invoices for the associated owner/architect at step s2234. In an embodiment, the A/R invoices may be created from the application for payment by creating a file compatible with the accounting system 113 import tool, such as an import-text-file, using default A/R import template field definitions. The A/R module is then launched to import the file to the accounting system 113, and the A/P invoices corresponding to the applications for payment are posted like any other A/P invoice.

Multiple items on an application for payment may be merged into a single item on an accounting system invoice, for example, when the multiple items of the application for payment refer to the same accounting system commitment item.

In an embodiment, the integrator 114 may also include a job cost display, which uploads a point-in-time snapshot of the accounting system job cost from the accounting system 113 to the contract administration program on the web server 52. Each job/extra/cost code/category combination may then be mapped to an item on the schedule of values for a particular job. For example, each item on the job costs report may be listed on a contract administration program web page provided by the web server 52, and a line item of the schedule of values may be entered in a field corresponding to the job cost item. This reveals the actual cost for each line item of the schedule of values, which assists the general contractor in preparing its (receivable) application for payment to the owner/architect and increases the timeliness and accuracy of billings.

It is understood that various terminology, such as vendors, commitments and contracts, are merely illustrative, based on use of Timberline® Office as an example of the accounting system 113. The terms are intended to distinguish information used in the contractor administration program from information used in the accounting system terms, which may overlap. However, the various terms are for explanation purposes, and do not limit the scope or spirit of the present invention.

In an embodiment, the contract administration program further includes query capability, residing on the web server 52, which enables structured searches of the database 53 to extract and retrieve information. For example, the structured query may identify projects, date or date ranges, specific fields from schedules of values and/or applications for payment, and the like. Upon retrieval, the requested information may be displayed at web clients 102-105, for example. In an embodiment, the information may be displayed in a text format.

Also, user defined extract files may be obtained, on demand or according to user defined criteria, such as scheduled dates or times. The extracted information may be displayed at the web clients 102-105, for example. The user (e.g., the general contractor at the web client 103) may import the extracted files into its own system of record (e.g., accounting system 113) for various reporting purposes.

In another embodiment, the contact administration program is configured to generate work in process (WIP) reports by populating predetermined fields of the report based on contract administration data and calculating entries to other predetermined fields of the report. Generation of the WIP reports includes change order information, which have been submitted and/or approved by the general contractor and subcontractors. FIG. 23 is an exemplary spread sheet indicating a work in process report 2300 of sample projects 1 and 2, according to an aspect of the present invention. FIG. 23 may be a screen shot provided by the web server 52 to the general contractor at the web client 103, for example. It is understood, however, that other participants may implement work in process reports via the web server 52, which reports may be displayed at corresponding web clients 102, 104 and 105. Also, for convenience, the WIP report 2300 has been divided into 2300a and 2300b, although it is understood that the top and bottom rows in 2300b correspond to the same jobs to which the top and bottom rows in 2300a correspond.

A work in process report provides a way for contract participants to quickly evaluate the financial status of each job using the contract amounts, revenue and costs incurred to date, estimates of revenue and costs to be incurred through the project completion, current billings to date, gross profit and other factors, as shown in FIG. 23, for example. Using these amounts, calculations of underbillings and overbillings can be completed, providing the participant's cash position on each job. This data may be gathered throughout a given time period and accumulated in one report.

Although some financial accounting packages provide WIP reports, the cost and revenue data must be added to the financial accounting package for the report to generate correctly. Therefore, automatic provisioning of the WIP reports leads to increased report accuracy and project tracking efficiency. Further, account package typically do not adequately capture change orders.

By requiring participants to approve additional cost items, the contract administration program can provide accurate cost data relevant to the creation of WIP reports. For example, the participant provides an estimate of costs to be incurred until the job is complete (e.g., column G of FIG. 23), and the contract administration program automatically calculates estimated revenue remaining to job completion, as discussed below, thus providing an accurate financial position of each job.

Figure 24:
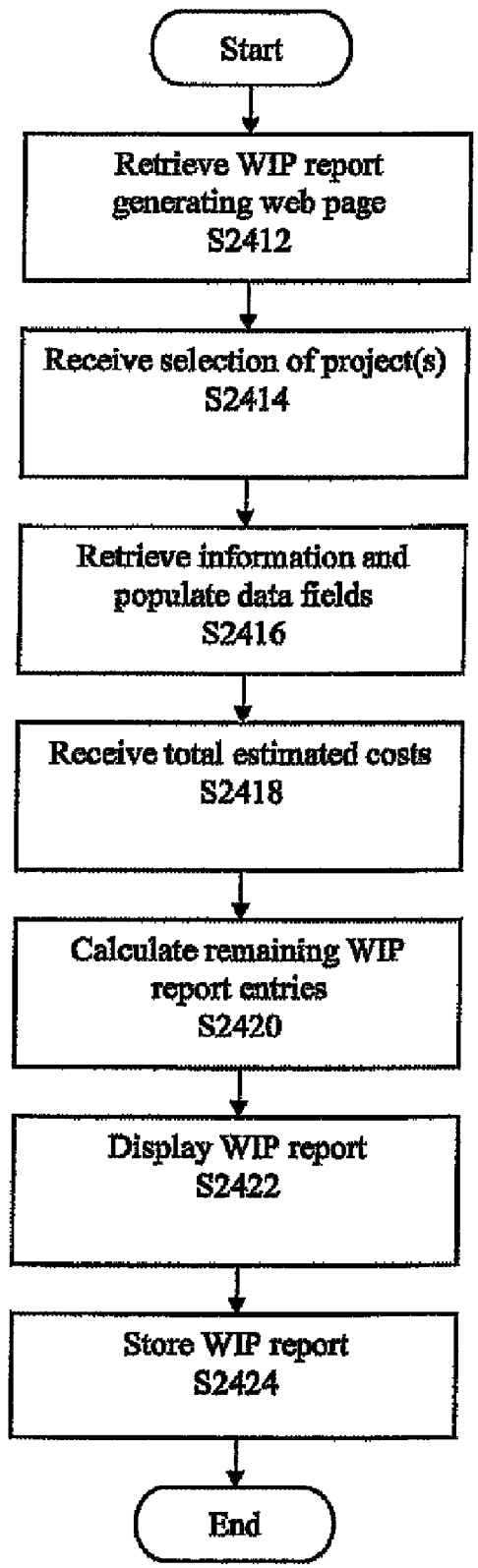
FIG. 24 is a flowchart depicting an exemplary process by which a work in process report is provided, according to an aspect of the present invention.

FIG. 23 will be discussed with reference to a general contractor, accessing the web server 52 via the web client 103, as an example of a contract participant generating a WIP report using the contract administration program. FIG. 24 is a flowchart depicting an exemplary process by which a work in process report is provided, according to an aspect of the present invention.

In an embodiment, the general contractor selects a "WIP report" tab, for example, from a Welcome web page or home page whenever it accesses the web server 52. A WIP report web page is then displayed at the web client 103 at step s2412 of FIG. 24. The WIP report web page may include, for example, a list of jobs and/or job numbers from which the general contractor may select at step s2414. In an embodiment, the general contractor may select an "all" button, for example, to generate WIP reports for all pending projects.

Upon initiation of a WIP report, the contract administration program automatically populates many of the report fields or columns using previously calculated and/or stored data accumulated during administration of the particular contract at step s2416. For example, in an illustrative embodiment, the contract administration program automatically populates the job number (column A), job name (column B), contract amount (column C), revenues earned from inception of the project (column E), total cost incurred from the inception of the project (column F), and the amount billed to date (column I). These entries may be retrieved from the database 52, for example. The revenues earned are the revenue amounts corresponding to the work performed, all or a portion of which are reflected in the general contractor's applications for payment to the owner/architect, and the total cost incurred includes payments or payment obligations made in response to the subcontractors' received (and approved) applications for payment. Likewise, the amount billed to date includes all of the applications for payment which have been submitted to the owner architect, payments of for which have not necessarily been received. This information is reflected in the schedule of values as work progresses, as discussed above.

At step s2418, the user enters estimated costs in a total estimated cost field (column G). The total estimated costs include cost items in addition to the cost items identified by the subcontractors' applications for payment, which are tracked by the contract administration program. For example, the additional cost items may include internal costs (as opposed to external costs) incurred by the general contractor in association with contract performance, which are not necessarily tracked by the contract administration program. For example, internal cost may include internal labor and material costs for work performed directly by the general contractor rather than subcontracted to another party. These estimated additional costs may be added to the recorded costs (either manually by the user or automatically by the contract administration program) in order to determine the total estimated costs.

At step s2420, the contract administration program calculates the remaining entries in the WIP report 2300. For example, in an illustrative embodiment, the contract administration program calculates estimated gross profit (column D), gross profit (column H), estimated cost to complete (column J), cost and estimated earnings in excess of billings (column K) and billings in excess of costs and estimated earnings (column L) with respect to project performance from inception to the date of the report, e.g., shown as Mar. 31, 2008. Also, the contract administration program calculates revenue (column M), cost (column N) and gross profit (column O) with respect to the most recent reporting period, e.g., the previous 6 months ended Mar. 31, 2008.

The estimated gross profit is calculated by subtracting the total estimated costs (column G) from the contract amount (column C), and entered in column D. The gross profit is calculated by subtracting the revenues earned (column E) from the total cost incurred (column F), and entered in column H. The estimated cost to complete is calculated by subtracting the total estimated costs (column G) from the total cost incurred (column F), and entered in column J Both the cost and estimated earnings in excess of billings, which represent overbillings, and the billings in excess of costs and estimated earnings, which represent underbillings, are determined by subtracting the billed to date (column I) from the revenues earned (column E). When the revenues earned are less than the amount billed to date, this indicates the project is overbilled, and the amount is entered in column K, as shown with respect to Job No. 1. When the revenues earned are greater than the amount billed to date, this indicates the project is underbilled, and the amount is entered in column L, as shown with respect to Job No. 2.

With respect to the current time period calculations, the revenue is calculated by subtracting all of the revenue earned and/or booked in previous time periods (e.g., from previous WIP reports on the same project) from the revenues earned (column E), and entered in column M. The cost is calculated by subtracting all of the costs incurred and/or booked in previous time periods (e.g., from previous WIP reports on the same project) from the total cost incurred (column F), and entered in column N. The gross profit for the current time period is calculated by subtracting the current period cost (column N) from the current period revenue (column M), and entered in column O.

The completed WIP report 2300 is displayed to the user at step s2422, for example, at the web client 103. Also, the various entries are stored at steps s2424 in the database 52 for tracking purposes, and to provide data for generation the next WIP report(s). In an embodiment, past reports and/or associated data may be accessed via the web server 52. Also, in an embodiment, the WIP reports and/or associated data may be downloaded to the accounting system 113 via the integrator 114.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

What is claimed is:

1. A system for administering performance of a project, the system comprising:
   a web server configured to execute a project in a contract administration program, the project comprising a subcontractor schedule of values (SOV) corresponding to at least one subcontractor and a general contractor SOV corresponding to a general contractor;

a web client in communication with the web server via a first network, and configured to receive a subcontractor application for payment (AFP) from the at least one subcontractor via the web server for performance of at least a portion of the subcontractor SOV;

an accounting system configured to execute a job in internal accounting records of the general contractor corresponding to the project, the job comprising at least one commitment corresponding to the subcontractor SOV and a contract corresponding to the general contractor SOV; and an integrator configured to interface the web client and the accounting system via a second network, enabling the accounting system to automatically update the job in the internal accounting records to reflect the subcontractor AFP, wherein the accounting system receives the subcontractor AFP from the web client via the integrator and creates at least one accounts payable (A/P) invoice corresponding to the subcontractor AFP.

2. The system of claim 1, wherein the web server is configured to receive the at least one A/P invoice from the accounting system via the integrator and the web client, and to create a general contractor AFP based at least in part on the at least one A/P invoice.

3. The system of claim 2, wherein the accounting system further receives the general contractor AFP via the integrator and creates at least one accounts receivable (A/R) invoice corresponding to the general contractor AFP.

4. The system of claim 3, wherein the accounting system reconciles actual job costs based on the subcontractor AFP and the general contractor AFP.

5. The system of claim 1, wherein the first network comprises the interne and the second network comprises a local area network (LAN).

6. The system of claim 5, further comprising:

an open database connectivity (ODBC) data source pointing to a database associated with the accounting system; and an application programming interface (API) configured to interface between the integrator and the accounting system.

7. The system of claim 2, the web client comprises a graphical user interface configured to display at least the at least one A/P invoice and the general contractor AFP based at least in part on the at least one A/P invoice.

8. The system of claim 1, wherein the integrator comprises software or middleware executable by the web client.

* * * * *